United States Patent
Dagley et al.

(10) Patent No.: US 11,720,862 B2
(45) Date of Patent: *Aug. 8, 2023

(54) SYSTEM AND METHOD FOR GENERATING MAINTENANCE ACTIONS OF A VEHICLE BASED ON TRAINED MACHINE LEARNING OF MONITORED VEHICLE DATA

(71) Applicant: Capital One Services, LLC, McLean, VA (US)

(72) Inventors: Geoffrey Dagley, McKinney, TX (US); Qiaochu Tang, The Colony, TX (US); Habeeb Hooshmand, Katy, TX (US); Micah Price, Plano, TX (US); Staevan Duckworth, The Colony, TX (US); Stephen Wylie, Carrollton, TX (US); Jason Hoover, Grapevine, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 941 days.

This patent is subject to a terminal disclaimer.

(21) Appl. No.: 16/294,221

(22) Filed: Mar. 6, 2019

(65) Prior Publication Data

US 2020/0285970 A1    Sep. 10, 2020

(51) Int. Cl.
*G06Q 10/20* (2023.01)
*G06Q 30/0201* (2023.01)

(52) U.S. Cl.
CPC ......... *G06Q 10/20* (2013.01); *G06Q 30/0206* (2013.01)

(58) Field of Classification Search
None
See application file for complete search history.

(56) References Cited

U.S. PATENT DOCUMENTS 9,824,453 B1 * 11/2017 Collins ................. G06V 20/20
10,956,982 B1 * 3/2021 Hayward ............... G07C 5/008
(Continued)

FOREIGN PATENT DOCUMENTS

WO    WO-2017142536 A1 *  8/2017 ......... G01C 21/3438

OTHER PUBLICATIONS

Total cost of ownership, wikipedia, archievs org, Feb. 13, 2019 https://web.archive.org/web/20190213161048/https://en.wikipedia.org/wiki/Total_cost_of_ownership (Year: 2019).*

(Continued)

*Primary Examiner* — Octavian Rotaru
(74) *Attorney, Agent, or Firm* — Hunton Andrews Kurth LLP

(57) ABSTRACT

Systems and methods for providing a disposal recommendation for a vehicle are provided. The method includes generating a profile for a first vehicle, the first vehicle being an income generating vehicle and the first vehicle profile including at least age, mileage, and location of the first vehicle, receiving monitoring data of the first vehicle, and receiving sales data for second vehicles, the second vehicles corresponding to the profile. The method may further include generating predicted depreciation data of the first vehicle, based on the sales data and the monitoring data, generating a predicted profit data from the first vehicle, and providing a recommended disposal time for the first vehicle, based on the predicted depreciation data and the predicted profit data.

20 Claims, 12 Drawing Sheets

(56) References Cited

U.S. PATENT DOCUMENTS

| | | | | |
|---|---|---|---|---|
| 2002/0128882 | A1* | 9/2002 | Nakagawa | G06Q 30/02 705/4 |
| 2004/0236641 | A1* | 11/2004 | Abbott | G06Q 10/0631 705/28 |
| 2007/0078791 | A1* | 4/2007 | Vyas | G06Q 30/0283 705/400 |
| 2008/0059081 | A1* | 3/2008 | Gualandri | G06Q 30/0283 702/182 |
| 2010/0057479 | A1* | 3/2010 | De | G06Q 10/20 705/305 |
| 2011/0128118 | A1* | 6/2011 | Gilleland | G06Q 10/063114 340/5.2 |
| 2013/0204466 | A1 | 8/2013 | Ricci | |
| 2015/0348058 | A1* | 12/2015 | Liu | G06Q 30/0201 701/31.5 |
| 2015/0348142 | A1* | 12/2015 | Endras | G06Q 30/0278 705/306 |
| 2016/0027071 | A1* | 1/2016 | Krutchik | G06Q 30/0278 705/306 |
| 2016/0162817 | A1* | 6/2016 | Grimaldi | G06Q 10/0633 705/7.27 |
| 2016/0189304 | A1* | 6/2016 | Todasco | G06Q 40/08 705/4 |
| 2017/0061459 | A1 | 3/2017 | Dow et al. | |
| 2018/0108058 | A1* | 4/2018 | Cotton | G06Q 30/0278 |
| 2019/0251586 | A1* | 8/2019 | Stutsman | G06Q 30/0206 |
| 2019/0266562 | A1* | 8/2019 | Kanaoka | H04W 4/35 |
| 2021/0215491 | A1* | 7/2021 | Liu | H04W 4/40 |

OTHER PUBLICATIONS

Life-cycle cost analysis, wikipedia, archives org, Oct. 20, 2016 https://en.wikipedia.org/wiki/Life-cycle_cost_analysis#:~:text=Life%2Dcycle%20cost%20analysis%20(LCCA,be%20implemented%20on%20technical%20grounds. (Year: 2016).*

On-board diagnostics, wikipedia, archives org, Dec. 23, 2018 https://web.archive.org/web/20181223064709/https://en.wikipedia.org/wiki/On-board_diagnostics (Year: 2018).*

* cited by examiner

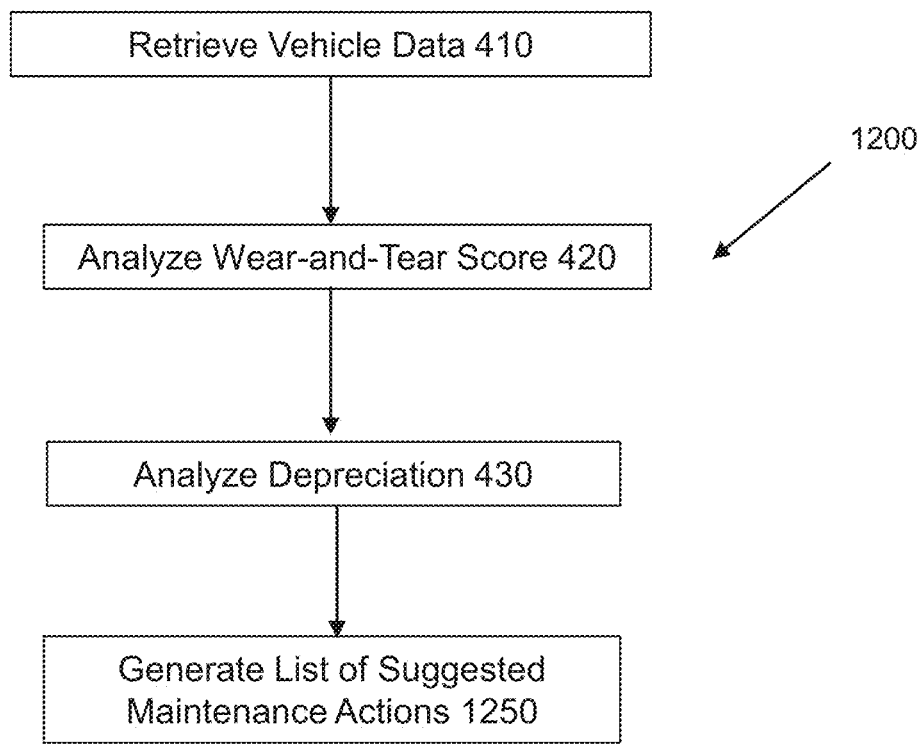
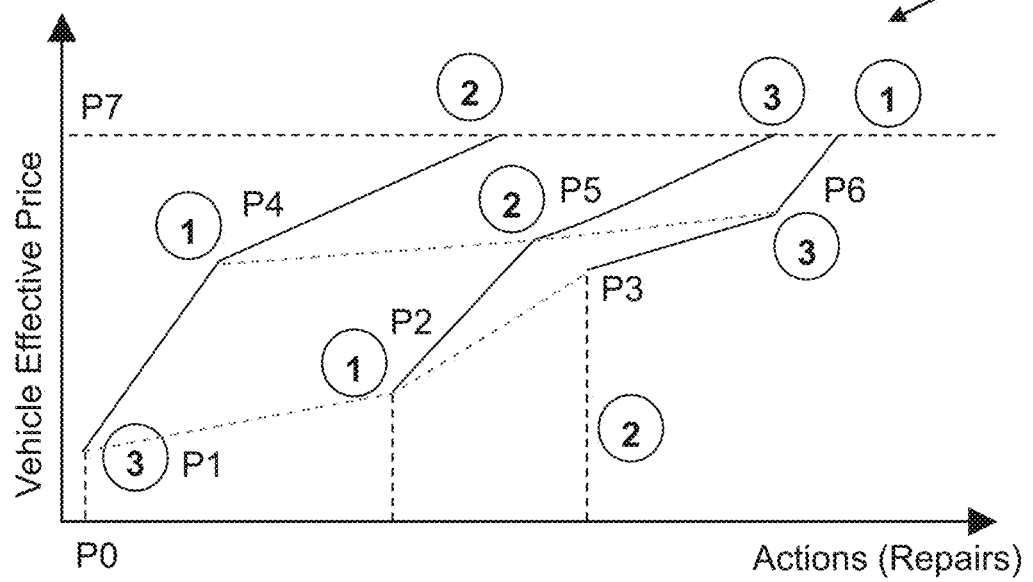

Interface 194

SYSTEM AND METHOD FOR GENERATING MAINTENANCE ACTIONS OF A VEHICLE BASED ON TRAINED MACHINE LEARNING OF MONITORED VEHICLE DATA

TECHNICAL FIELD

The present invention generally relates to methods and systems for providing financial recommendations, and, more particularly for providing a recommendation for a disposal time for an income-generating vehicle.

BACKGROUND

A business that generates income from vehicles or equipment, such as a car rental company, must sell the vehicles at a right time and price. In today's market, there are a number of services that provide information and tools to help users sell their cars. However, there are not as many tools available for businesses that deal with income-generating vehicles or equipment. In order to stay competitive, auto lenders and equipment renting businesses need to understand financial data related to their assets. Such data may provide insight into historical and current depreciation patterns that can help forecast future purchases and sales of the inventory owned by the businesses.

Accordingly, there is a need for providing systems and methods that can assist auto lenders and equipment rental companies in determining a value of their assets, an income that can be generated by the assets, and the best time for disposal of the assets. The disclosed system and methods address the problems set forth above as well as other deficiencies in existing systems and methods.

SUMMARY

Disclosed embodiments provide systems and methods for determining the value of a vehicle and for providing a disposal recommendation for a vehicle.

Consistent with a disclosed embodiment, a method for providing a disposal recommendation for a vehicle is provided. The method may comprise generating a profile for a first vehicle, the first vehicle being an income generating vehicle and the first vehicle profile comprising at least age, mileage, and location of the first vehicle, receiving monitoring data of the first vehicle, and receiving sales data for second vehicles, the second vehicles corresponding to the profile. The method may further comprise generating predicted depreciation data of the first vehicle, based on the sales data and the monitoring data, generating a predicted profit data from the first vehicle, and providing a recommended disposal time for the first vehicle, based on the predicted depreciation data and the predicted profit data.

Consistent with another disclosed embodiment, a system for providing a disposal recommendation for a vehicle is provided. The system may comprise a database configured to store a profile for a first vehicle, the first vehicle being an income generating vehicle and the first vehicle profile comprising at least age, mileage, and location of the first vehicle. The database may further be configured to store monitoring data for the first vehicle, and store sales data for second vehicles, the second vehicles corresponding to the profile. The system may further comprise a processor configured to generate predicted depreciation data of the first vehicle, based on the sales data and the monitoring data. The processor may further be configured to generate a predicted profit data from the first vehicle, and provide a recommended disposal time for the first vehicle, based on the predicted depreciation data and the predicted profit data.

Consistent with another disclosed embodiment, a non-transitory computer-readable medium storing instructions for providing a disposal recommendation for a vehicle is provided. The instructions may be executed by a processor and cause the processor to perform steps of generating a profile for a first vehicle, the first vehicle being an income generating vehicle and the first vehicle profile comprising at least age, mileage, and location of the first vehicle, receiving monitoring data of the first vehicle and receiving sales data for second vehicles, the second vehicles corresponding to the profile. The steps may further include generating predicted depreciation data of the first vehicle, based on the sales data and the monitoring data, generating a predicted profit data from the first vehicle, and providing a recommended disposal time for the first vehicle, based on the predicted depreciation data and the predicted profit data.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, the emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings:

FIG. 12 is a flowchart of an illustrative process of generating a list of actions, consistent with disclosed embodiments.

FIG. 13 is a chart of illustrative actions leading to an increase in an effective price of a vehicle, consistent with disclosed embodiments.

DETAILED DESCRIPTION

Figure 1:
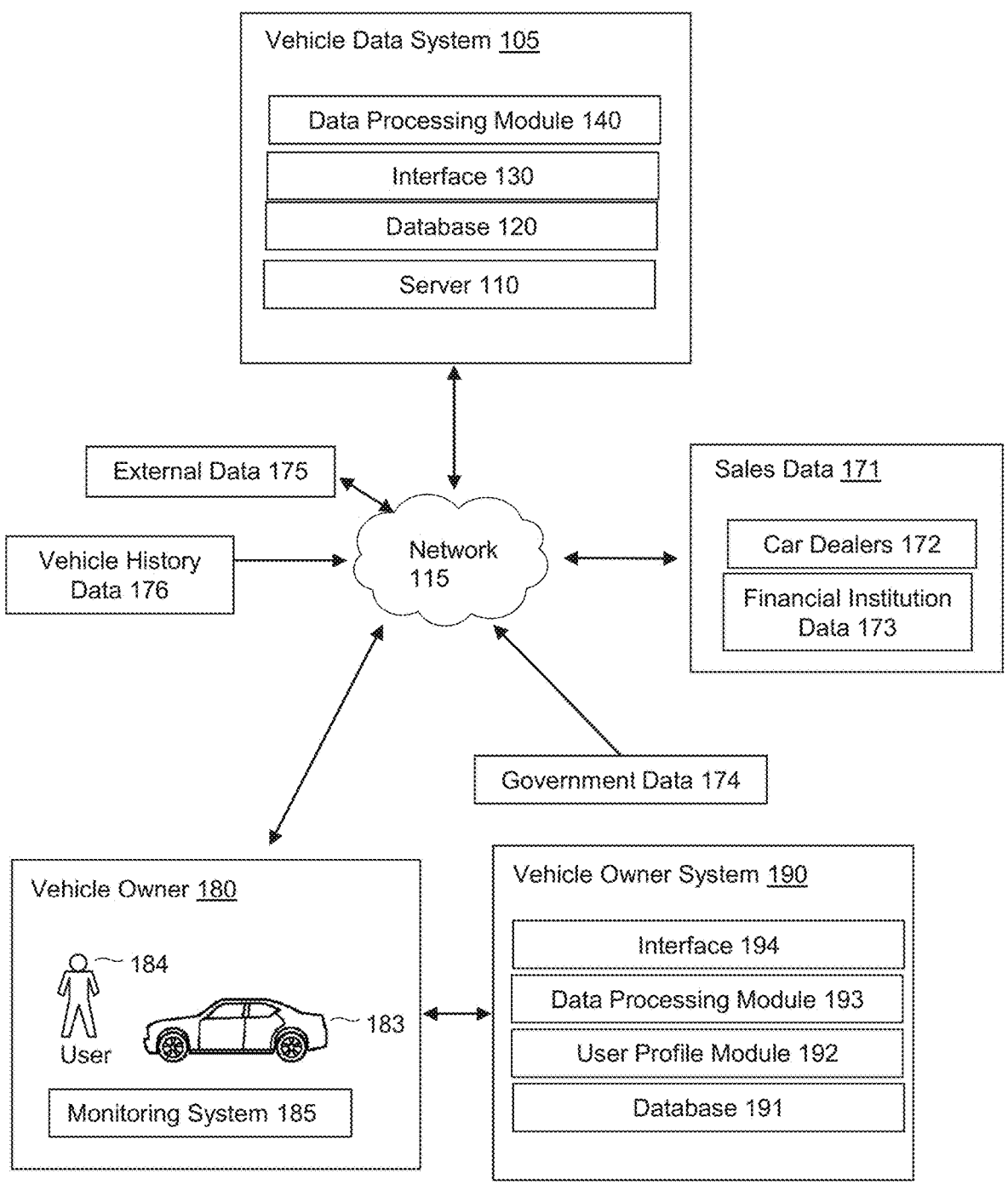
FIG. 1 is a diagram of an illustrative system for managing vehicle-related data consistent with disclosed embodiments.

Reference will now be made in detail to exemplary embodiments, discussed with regards to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

The disclosed embodiments describe systems and methods for providing a recommendation for disposal of an inventory for an inventory owning entity based on a depreciation of the inventory, inventory condition, and/or an income generated by the inventory. It should be noted, however, that various aspects of the disclosed embodiments are not limited to providing a recommendation for disposal of an inventory for an inventory owning entity. The disclosed embodiments may describe systems and methods for providing a recommendation for disposal of a personal vehicle, or a personal inventory based on at least a depreciation of the vehicle or the inventory.

As used herein, unless otherwise noted, the term "inventory" should be interpreted broadly. For example, an inventory may be a vehicle used for transportation (e.g., scooter, bicycle, motorcycle, car, train, plane, boat, water scooter, blimp, rocket) or an equipment, such as, a bulldozer, an excavator, a loader, a backhoe loader, a crane, or the like. In some cases, when applicable to the discussion, the equipment may include various tools (e.g., power tools, etc.). The embodiments of the disclosure may be applicable to any type of inventory that may or may not generate a profit for an inventory owning entity, which is referred to as an inventory owner, a vehicle owner or simply an owner throughout the disclosure. In some embodiments, when interpreted broadly, the term inventory may be extended to private and commercial real estate. In some embodiments, when a method describing disposing of an inventory does not make any assumptions about the inventory's nature, the method may be applied to any type of inventory.

As used herein, unless otherwise noted, the term "depreciation" refers to a loss in an inventory value relative to a price paid for the new inventory. For example, a car that costs $30,000 when new, and $26,000 after one year of use, the car depreciation is $4,000 or 14% loss from the original price. In the present disclosure, inventory depreciation may be defined either in terms of price loss (e.g., $4,000) or in terms of percentage loss (e.g., 14% loss from the original price). The term "price," "current price" or "expected price" is the amount of money that an inventory owner is expecting to get when selling the inventory.

The inventory depreciation is one of the losses to an inventory owner associated with owning an inventory. Another loss is related to costs associated with the inventory maintenance. As used herein, unless otherwise noted, the term "costs" refers to the amount of money inventory owner need to spend to maintain the inventory. The inventory maintenance may include costs associated with repairing an inventory, cleaning the inventory, operating the inventory or making payments on the inventory. The described inventory maintenance costs are only illustrative, and other maintenance costs may be presented to an inventory owner.

The inventory maintenance may be closely related to the term "wear-and-tear score" associated with a given inventory. The wear-and-tear score relates to a condition of the inventory and is assigned to the inventory based on various possible methods discussed further. In some embodiments, a wear-and-tear score may include a single number, and in some cases, the wear-and-tear score may contain a list of numbers (e.g., {Score 1, Score 2, . . . Score N}) detailing score for various aspects of the inventory. For example, in some embodiments, a first score (Score 1) may be related to an outward appearance of the inventory, while a second score (Score 2) may be related to a condition of a mechanical component of the inventory.

In various embodiments, inventory owner may use inventory to generate an income. For example, the inventory owner may be a car rental company that generates an income by renting cars. In some embodiments, the inventory owner may be a car leasing company, or equipment leasing company. In various embodiments discussed herein, vehicles are used as an example inventory. However, various aspects of the invention may be applied to any other suitable inventory. In various embodiments henceforth, an inventory owner is referred to as a vehicle owner.

FIG. 1 shows a system 100 consistent with various embodiments of the present invention. In various embodiments, system 100 may be configured to collect and process vehicle data, receive inquiries about the vehicle data from vehicle owners, and communicate data for the requested inquiries to the vehicle owners. In some embodiments, system 100 may be associated with a vehicle owner, and in some embodiments, system 100 may be provided by a third party for vehicle owners. System 100 comprises a set of components including a vehicle data system 105 coupled through a network 115 to a vehicle owner 180. System 100 may further include sales data (i.e., data related to sales of various vehicles) 171, government (e.g., DMV) data 174, external data 175, and vehicle history data 176. Sales data 171 may include data obtained from car dealers/car auctions 172 or the like, as well as data 173 from financial institutions.

System 100 may allow vehicle data system 105 to communicate with network 115 via a server 110, store data in a database 120, and process vehicle-related data via a data processing module 140. In various embodiments, system 100 may communicate with vehicle owner 180 through an interface 130. System 100 may include a computer-readable storage medium that can retain and store program instructions for execution by a processor.

The computer-readable storage medium may be, for example, but is not limited to, an electronic storage device, a magnetic storage device, an optical storage device, an electromagnetic storage device, or any suitable combination of the foregoing. A non-exhaustive list of more specific examples of the computer-readable storage medium may include a hard disk, a random access memory (RAM), a read-only memory (ROM), an erasable programmable read-only memory (EPROM or Flash memory), a static random access memory (SRAM), a portable compact disc read-only memory (CDROM), a digital versatile disk (DVD), a memory stick, or/and the like.

Program instructions stored on a computer-readable storage medium may include assembler instructions, machine dependent instructions, firmware instructions, source code or object code written in any combination of one or more programming languages, including an object oriented programming languages, procedural programming languages or functional programming languages. The programming language may be Fortran, Lisp, C++ or the like. The program instructions may be executed by a processor of the interaction system. In some embodiments, the program instructions may be executed by a processor of the user device, and in some embodiments, both the user device processor and the processor of the interaction system may execute program instructions.

In various embodiments, vehicle data system 105 may receive sales data 171 related to various vehicles via server 110 and store sales data 171 in database 120. In some embodiments, sales data 171 may include car dealers' data 172. In some embodiments, car dealers may communicate data 172 voluntarily, and, in some embodiments, car dealers' data 172 may be obtained by collecting information from a dealer's website which may be accessed over network 115. Collected sales data 171 may include pricing data, as well as data related to the year, make, model, trim, mileage of the vehicle or the like. In some embodiments, sales data 171 may be collected from polling companies, inventory management companies or listing aggregators which may obtain and store inventory data from one or more dealers. Inventory polling companies, for example, are typically commissioned by the dealer to pull car dealers data 172 and format the data for use on websites; thus, inventory polling companies may contain all the necessary data 172 available from car dealers.

In various embodiments, vehicle data system 105 may receive financial institution data 173 related to sales data 171 for various vehicles. Financial institution data 173 may include data from entities such as banks, credit union, etc. that provide any type of financial services to a participant involved in the purchase of a vehicle. For example, when a buyer purchases a vehicle, the buyer may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle. While vehicle data system 105 may be implemented by a first party, in some embodiments of the present invention, system 105 may be associated with a financial institution.

In various embodiments, vehicle data system 105 may receive government data 174 related to various vehicles. Government data 174 may be associated with sales data 171. Government data 174 may include any data related to a vehicle. For example, when the vehicle is purchased, it must be registered with the state (for example, DMV, Secretary of State, etc.) for tax and titling purposes. Government data 174 associated with such purchase typically includes vehicle attributes (for example, model year, make, model, mileage, etc.) and sales transaction prices for tax purposes. As used herein, unless otherwise noted, the term "vehicle attributes" includes at least vehicle make, model, year, and trim. In addition, vehicle attributes may be associated with other vehicle-related data. In various embodiments, unless otherwise noted, when comparing vehicles, vehicles with the same vehicle attributes are compared.

In some embodiments, system 105 may receive external data 175 related to sales data 171 for various vehicles. External data 175 may comprise various other information sources, online or otherwise, which may provide other types of desired data, such as data regarding location of vehicles, demographics at vehicle locations, current economic conditions, fuel prices, interest rates, and vehicle insurance rates that may influence current and future vehicle prices. In some embodiments, external data 175 may include data from manufacturers. In order to guide the pricing of their vehicles, the manufacturers may provide an invoice price and a manufacturer's suggested retail price (MSRP) for vehicles to be used as general guidelines for the dealer's vehicle price. These fixed prices may vary slightly by geographic region. In various embodiments, external data 175 for vehicle data system 105 may include vehicle-related data collected from various users driving a variety of vehicles.

In various embodiments, system 105 may receive vehicle history reports such as vehicle history data 176. For example, vehicle history data 176 may be obtained from services such as Carfax Inc. The vehicle history data may include a vehicle year, make, model, trim, overall vehicle condition as determined by a party not interested in sale of the vehicle (e.g., a professional technician hired to evaluate vehicle condition), number of owners, accident history, service history, registration history, open recalls and vehicle use (e.g., rental, fleet, personal). In some embodiments, history data for a vehicle may include historical data related to sales of the vehicle.

In some embodiments, vehicle data system 105 may obtain by gathering (or receiving) sales data 171 and vehicle history data 176. This data may include sales and historical data for a variety of vehicle configurations. Sales data 171 and vehicle history data 176 may be obtained at different time intervals, where the time interval utilized in any particular embodiment for a certain type of data may be based, at least in part, on how often that data is updated at the source, how often new data of that type is generated, an agreement between the source of the data and the providers of the vehicle data system 105 or a wide variety of other factors.

In various embodiments, vehicle data system 105 may include a data processing module 140, for data analysis and data manipulation. For example, data processing module 140 may evaluate if the obtained data is duplicative, falls within expected ranges, or/and conforms to expected values. In some embodiments, module 140 may compare data for different vehicles and match data that correspond to the same vehicle. In an illustrative embodiment, module 140 may obtain vehicle identifiable information (e.g., vehicle identification number (VIN)) and store all the related information for the vehicle associated with that vehicle identifiable information.

Vehicle data system 105 may interact with vehicle owner 180 and an associated vehicle owner system 190. In various embodiments, vehicle owner 180 may maintain a vehicle 183 operated by a user 184. In various embodiments, vehicle owner 180 may have vehicles operated by one or more users, and for brevity, vehicle 183 may refer to any of the vehicles owned by owner 180, and user 184 may refer to any of the users operating vehicles owned by vehicle owner 180. In various embodiments, vehicles 183 may correspond to the vehicles that were previously owned and disposed of by vehicle owner 180. In various embodiments, vehicle owner 180 may refer to an entity that owns vehicles 183 and may include one or more people or one or more organizations.

In various embodiments, vehicle owner 180 may maintain a monitoring system 185 for monitoring the use of vehicles 183 by users 184. Monitoring system 185 may include electronic and mechanical devices installed in vehicle 183 that measure various aspects of vehicle operation such as, for example, vehicle acceleration and deceleration (i.e., braking), vehicle speed, vehicle location, duration of a trip, mileage driven during a trip, angle and frequency of turning the vehicle, speed of a vehicle during various vehicle turns, road condition based on vibration of the vehicle and/or the like. In an illustrative embodiment, an electronic device may include a smartphone.

In an example embodiment, various parameters other than the ones listed above may be monitored by monitoring system 185. For example, system 185 may monitor an oil-changing date, an oil-changing target due date, a filter-changing date, a belt-changing date, and various information obtained from collecting onboard diagnostic data (OBD). The OBD data may be collected, for example, by electronic devices, such as OBD scanners, and transmitted to vehicle owner system 190 wirelessly, via a wired connection, or via a removable storage devices such as USB drives, memory cards, removable hard drives or the like.

In various embodiments, vehicle owner 180 may include a database 191 for maintaining data related to vehicles 183 and users 184. Vehicle owner system may also include a user profile module 192, a data processing module 193 for analyzing data associated with vehicles 183 and users 184, and an interface 194 for interfacing with database 191, user profile module 192 and data processing module 193.

In some embodiments, database 191 may include relevant information about vehicles 183 such as vehicles' make, model, trim, powertrain, options, geographical location, overall vehicle condition as determined by a mechanic, vehicle history, such as service history, vehicle expected depreciation as well as income generated by a vehicle. As used herein, unless otherwise noted, the term "vehicle data" refers to any data that can be stored in database 191 or database 120. In various embodiments, data associated with vehicles 183 may be presented to vehicle owner 180 through graphs or tables via interface 194.

In various embodiments, vehicle owner system 190 may generate a profile for vehicle 183 that may include data such as, for example, age, mileage, and location of vehicle 183. Vehicle profile data may be stored in database 191. In various embodiments, vehicle profile data may contain any vehicle data that may be used by vehicle owner 180 to infer when to dispose of vehicle 183. In some embodiments, vehicle profile data may contain links to vehicle data for other vehicles that have the same vehicle attributes as the attributes of vehicle 183.

In various embodiments, data processing module 193 may be used to analyze and manipulate data stored in database 191. For example, data processing module 193 may evaluate income generated by different vehicles as a function of time and plot related graphs using interface 194. In some embodiments, data processing module 193 may obtain data related to various vehicles from database 120 of vehicle data system 105 and evaluate tradeoffs in income for vehicle owner 180 resulted from selling vehicle 183 or buying a new or used vehicle to supplement the fleet of vehicles 183 of vehicle owner 180. The data obtained by data processing module 193 through analysis of data in databases 191 and 120 may be presented to vehicle owner 180 in a variety of ways via interface 194, such as through bar graphs, charts, tables, web pages or the like. In various embodiments, interface 194 may include, for example, a set of interactive web pages provided by vehicle owner system 190.

While in some embodiments vehicle owner system 190 may be maintained by vehicle owner 180, in other embodiments vehicle owner system 190 may be maintained by a third party. In some embodiments, vehicle owner system 190 may be part of vehicle data system 105 and may use the computer resources of system 105. In some embodiments, the vehicle owner system 190 may be accessed by vehicle owner 180 by logging into the account of owner 180 associated with system 190. In various embodiments, when vehicle owner system 190 maintained by a third party, vehicle owner 180 may outsource the support (e.g., information technology (IT) support) for system 190 to the third party.

In various embodiments, vehicle owner 180 may use interface 130 of system 105 to obtain various related information about other vehicles that vehicle owner may consider purchasing and leasing for generating income from vehicles. For example, using vehicle data system 105, vehicle owner 180 may specify a vehicle configuration by defining values for vehicle attributes (make, model, trim, powertrain, options, etc.) and/or other relevant information such as a geographical location. Information associated with the specified vehicle configuration may include a price of the vehicle, the expected vehicle depreciation, the expected income from the vehicle. This information may then be presented to vehicle owner 180 through interface 130.

Figure 2:
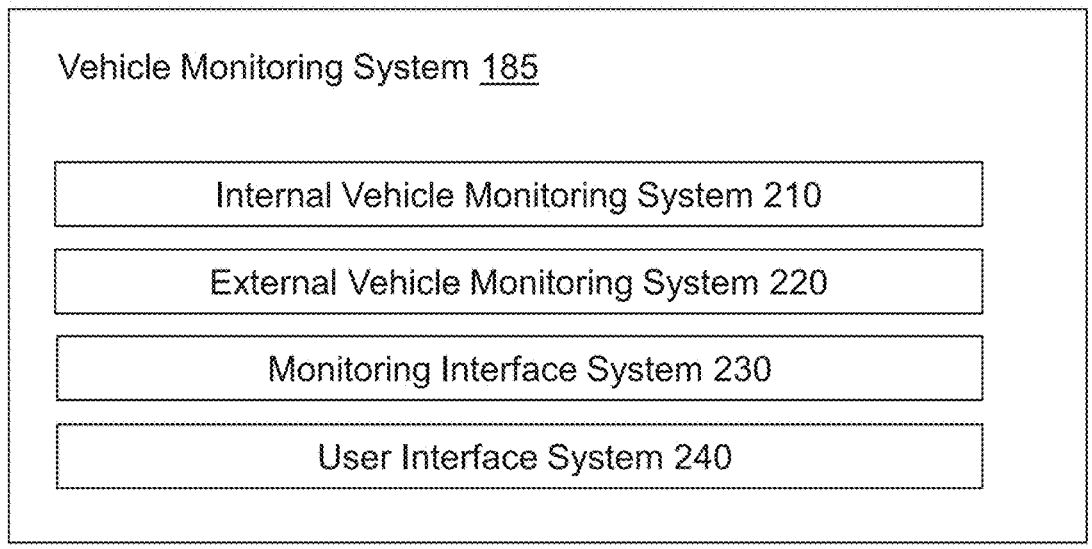
FIG. 2 is a diagram of components controlled by a vehicle owner, consistent with disclosed embodiments.

In some embodiments, vehicle owner 180 may maintain monitoring system 185 that may include multiple components that are shown for example in FIG. 2. In some embodiments, system 185 may include an internal vehicle monitoring system 210, an external vehicle monitoring system 220, a monitoring interface system 230 and a user interface system 220.

Internal vehicle monitoring system 210 may be used to monitor internal parameters of vehicle 183 such as OBD data collected with an OBD scanner. This monitoring data may include reporting faulty sensors (e.g., mass air flow sensor is faulty), low fuel pressure that can be related to dirty fuel filter, exhaust leak between the first oxygen sensor and engine, faulty oxygen sensor, misfire due to plugged fuel injector, catalytic converter failure, transmission range sensor circuit malfunction, or the like. In some embodiments, additional internal parameters may include failure of a timing belt that may be indicated by check engine light, brake failure (e.g., braking light is on), or odd noises generated by vehicle 183. Internal vehicle monitoring system 210 may include various sensors and scanners attached to a vehicle, such as OBD scanner, microphones positioned at various locations in the vehicle and connected to an audio recording device, temperature sensors, gas sensors, video cameras positioned at various locations in vehicle 183 and connected to video recording devices, or the like. In some embodiments, the sensors may include accelerometers, and gyroscopes providing data to a data storage unit that may be associated with system 210. In some embodiments, system 210 may further include a mobile device such as a smartphone for monitoring the vehicle location, speed, changes in the vehicle direction (e.g., cornering), as well as acceleration and decelerating of the vehicle.

In various embodiments, monitoring system 185 may also include an external vehicle monitoring system 220. System 220 may include one or more microphones, one or more cameras and/or one or more sensors for monitoring a vehicle interior and a vehicle exterior condition. For example, system 220 may include a camera that observes the maintenance of the vehicle interior. In some embodiments, exterior system 220 may include cameras that observe the vehicle exterior, such as the presence of dents and scratches on the vehicle exterior. In some embodiments, system 220 may include sensors that may detect a vehicle collision with other vehicles or objects. For example, system 220 may include a sensor that indicates that the vehicle has been hit from the back of the vehicle, from the front of the vehicle, from the side of the vehicle or the like. In some embodiments, the sensors associated with system 220 may detect that the vehicle has been impacted at a particular location. For example, sensors of system 220 may indicate that vehicle 183 has been impacted by an opening door of another vehicle. In some embodiments, the sensors may correlate the accelerometer data with the visual/sound data observed from a set of cameras or microphones, or in some embodiments, correlate the accelerometer data with available data related to the location of the vehicle. In an illustrative embodiment, sensors may detect the presence of a bump on a road and correlate the visual data of the bump with a vertical vibration of the vehicle as it passes over the bump. In addition, the sensors may correlate the vertical vibration with the speed of the vehicle while the vehicle is passing over the bump. In some embodiments, the presence of the bump may be obtained from the external data (e.g., data associated with the GPS location of the vehicle) that can be received by system 220.

In various embodiments, system 220 may also monitor weather condition at the location of the vehicle. For example, system 220 may include temperature sensors, air pressure sensors, wind sensors, humidity sensors, air quality sensors, salinity sensors (e.g., for detecting a presence of salt on a road), dust sensors, road condition sensors (e.g., for detecting a presence of bumps, water, dirt on a road), radiation sensors (e.g., for detecting an ultraviolet radiation), ozone sensors, or the like. As used herein, unless otherwise noted, the term "monitoring data" refers to any type of data that can be monitored by monitoring system 185.

In various embodiments, systems 210 and 220 may store the monitoring data in an associated data storage unit, and transmit the monitoring data to vehicle owner system 190 for storing in database 191. In some embodiments, the monitoring data may also be transmitted via a wireless or a mobile network, or via a dongle that may be connected to the data storage unit using a USB port. In some embodiments, the monitoring data may be transmitted via a mobile network at a predetermined frequency, and in some cases, data may be transmitted via the mobile network when a signal strength for the network is above a threshold value. For example, the monitoring data may be transmitted when the mobile network corresponds to a signal strength of the LTE connection. In some embodiments, the monitoring data may be transmitted after a significant vehicle-related event. For example, the monitoring data may be transmitted when a vehicle is hit, when the vehicle is operated outside standard vehicle operating regulations (e.g., the vehicle is speeding, the vehicle is involved in a collision, the vehicle reports a high deceleration or acceleration, or when the vehicle has faulty mechanical or electrical components, such as faulty brakes). When vehicle 183 is operated outside standard vehicle operating regulations, the monitoring data may not only be transmitted to database 191, but also directly reported to vehicle owner 180, or the monitoring data may be recorded in database 191 and flagged for further analysis.

While present discussion focuses on vehicles for transportation, such as cars, it is noted that other vehicles or other inventory may have monitoring functions that are specific to that type of inventory. For example, for the inventory including construction machinery, the external vehicle monitoring system 220 may include sensors that measure the amount of weight carried or lifted by the construction machinery, the machinery traction with the ground, the reaction force received by machinery during excavation, lifting, and drilling processes. In various embodiments, internal vehicle monitoring system 210 may receive data related to hydraulic pumps, and various mechanical components that may be unique to the machinery. In various embodiments, monitoring system 185 can be used for boats, airplanes, trains, bicycles, motorcycles or the like, with systems 210 and 220 tailored for a monitored vehicle. For example, when monitoring boats, monitoring system 185 may include sensors associated with leaks, humidity sensors, and sensors associated with surfaces of a hull of a boat to monitor the presence of growth (e.g., algae, barnacles, etc.)

Monitoring system 185 may not only monitor various aspects relating to vehicle 183, but may also be configured to monitor and record data associated with user 184. In an example embodiment, monitoring system 185 may monitor possible impairment of user 184. For instance, monitoring system 185 may detect if user 184 is driving under the influence, or is unusually agitated. In some instances, when authorized by user 184, and when agreed in a rental/lease agreement, monitoring system 185 may monitor movements of user 184, user emotional state (e.g., monitoring system 185 may monitor emotional state via video camera or audio recording), as well as actions of passengers in vehicle 183.

FIG. 2 shows that monitoring system 185 may include a monitoring interface system 230 associated with vehicle owner 180. Interface system 230 may allow owner 180 to monitor various parameters of vehicle 183, such as vehicle speed, location, vehicle mechanical/electrical condition, acceleration, etc. In some embodiments, interface system 230 may allow owner 180 to monitor vehicle in real time, and in some instances, monitoring system 230 may alarm owner 180 when vehicle 183 is operated outside standard vehicle operating regulations, or when vehicle experience mechanical/electrical failure or vehicle collision.

Figure 3:
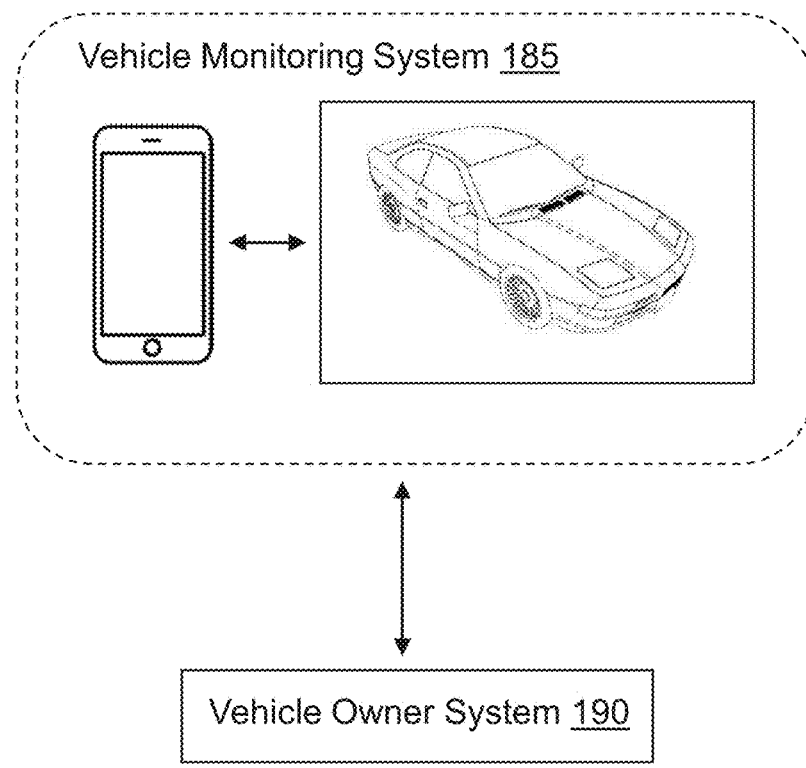
FIG. 3 is a diagram showing details of an illustrative vehicle monitoring system of FIG. 2, consistent with disclosed embodiments.

Monitoring system 185 may further include a user interface system 240. User interface system 240 may allow user 184 of vehicle 183 to monitor various parameters of vehicle 183, such as vehicle speed, location, vehicle mechanical/electrical condition, acceleration, etc. In some embodiments, interface system 240 may allow user 184 to monitor vehicle 183 in real time, and in some instances, monitoring system 230 may alarm user 184 when vehicle 183 is operated outside standard vehicle operating regulations, or when vehicle experience mechanical/electrical failure or vehicle collision. In various embodiments, user interface system 240 may include a screen that displays various parameters associated with vehicle 183. In some embodiments, the user may select the parameters to be displayed on the screen by interacting with a screen through a touchscreen or through a set of user inputs, such as buttons. In some embodiments, user interface system 240 may include a software application installed on a user mobile device such as a smartphone for interacting with monitoring system 185, as shown for example in FIG. 3. In some cases, vehicle monitoring system 185 may include a smartphone as a part of system 185 in communication with vehicle owner system 190 as shown in FIG. 3.

In various embodiments, vehicle monitoring system 185 may allow vehicle owner 180 to interact with user 184 through interfaces 230 and 240. For example, vehicle owner 180 may inform user 184 that vehicle 183 is being operated outside standard vehicle operating regulations, that vehicle 183 is experiencing a failure, or that vehicle 183 requires maintenance. In some cases, vehicle owner 180 may request rented or leased vehicle 183 to be returned to vehicle owner 180. In some cases, user 184 may request information from vehicle owner 180 about various aspects of operating vehicle 183. For example, user 184 may request information of vehicle clearance height, vehicle ride height, vehicle acceptable load, or the like.

Figure 4:
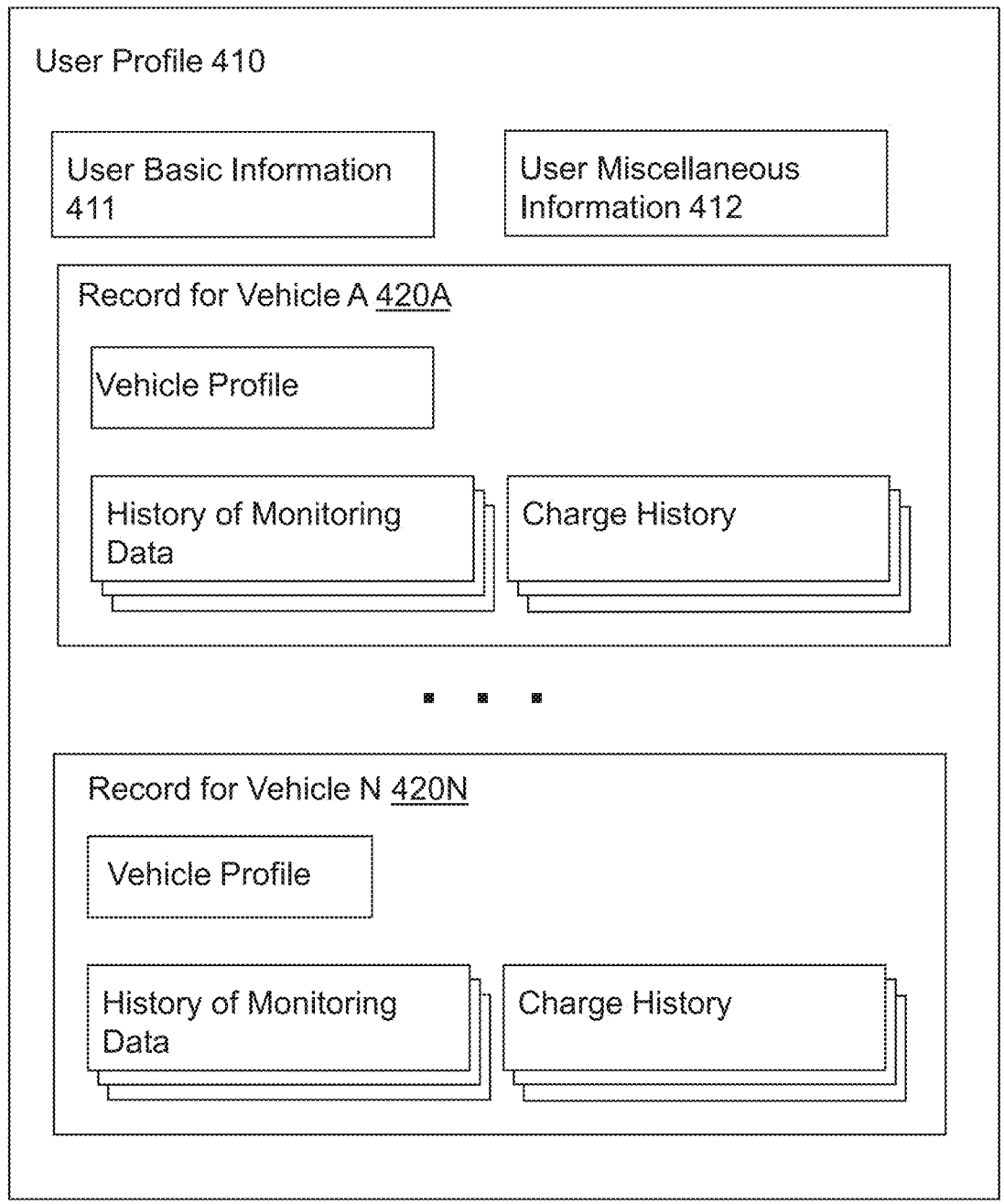
FIG. 4 is a diagram of an illustrative user profile module, consistent with disclosed embodiments.

Referring now to FIG. 4, in various embodiments, vehicle owner system 190 may maintain a user profile 410 via user profile module 192. User profile 410 may include user basic information such as user name, age, occupation, contact information, and any other user-related information provided by user 184. In some embodiments, user profile 410 may include user miscellaneous information 412 that may be obtained from a social media profile associated with user 184, as well as publicly available information about the user (e.g., internet related data). User profile 410 may be linked to a history of the monitoring data associated with each vehicle operated by user 184 as well as a history of various charges associated with the vehicle when operated by user 184. For example, FIG. 4 shows records 420A and 420N associated with a history of monitoring data recorded by monitoring system 185 and a charge history for vehicles A through N operated by user 184. The charge history may include gas or toll charges, or charges associated with vehicle repairs.

In various embodiments, streaming monitoring data may be uploaded to user profile 410 as a part of the history of the monitoring data stored in user profile 410. The streaming monitoring data and previously recorded monitoring data may determine various aspects of the current rental/lease agreement and aspects of future rental/lease agreements. For example, aspects of the rental/lease agreement may include rental/lease price for vehicle 183, the type of vehicle that can be rented/leased to user 184, locations where vehicle 183 may be used, times when vehicle 183 may be used, and possible conditions associated with various aspects of the rental/lease agreement. For example, one of the condition may be that user 184 pays an extra dollar a day for every one-mile-per-hour increase in vehicle speed over a speed limit.

Figure 5:
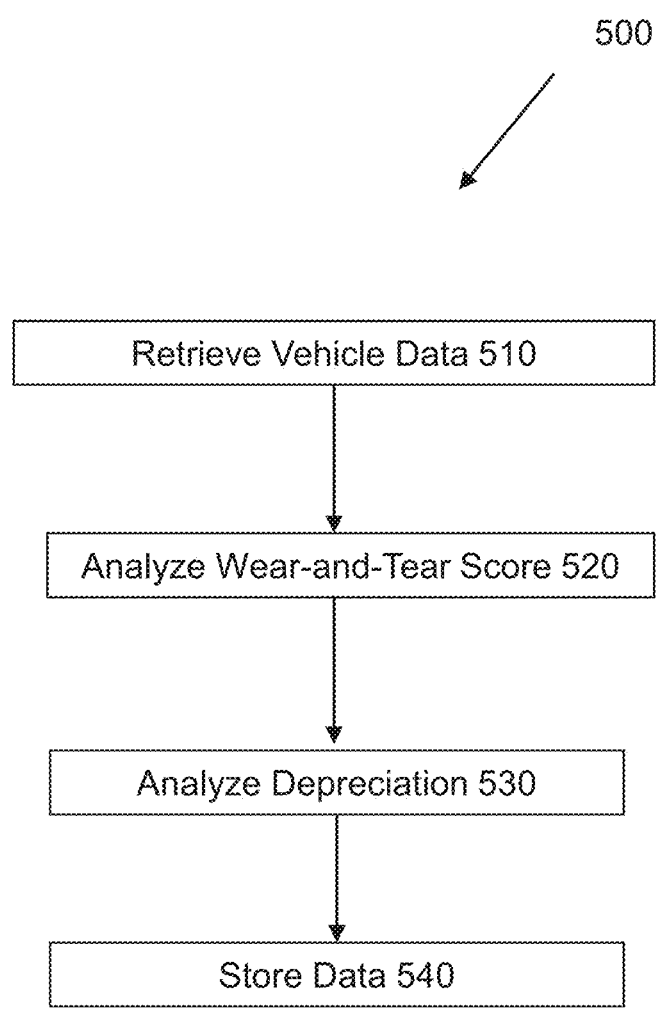
FIG. 5 is a flowchart of an illustrative process of analyzing vehicle-related data, consistent with disclosed embodiments.

In various embodiments, data processing module 193 of vehicle owner system 190 may analyze the vehicle data. FIG. 5 shows an example embodiment of a process 500 for analyzing the vehicle data. At step 510 of process 500, vehicle data associated with vehicle 183 may be retrieved. The vehicle data may include the monitoring data associated with vehicle 183, as well as repairs associated with vehicle 183. At step 520, data processing module 193 may evaluate a vehicle wear-and-tear score. The wear-and-tear score may be calculated based on vehicle data such as vehicle monitoring data, vehicle age, vehicle mileage, as well as repairs associated with vehicle 183.

In an illustrative embodiment, the wear-and-tear score may be calculated based on depreciation of various vehicles 183 owned by owner 180 in the past. For example, vehicle owner system 190 may maintain historical depreciation values for all vehicles 183 maintained and disposed of by owner 180. To evaluate a wear-and-tear score for a vehicle with given vehicle attributes, vehicle owner system 190 may retrieve depreciation values and vehicle data for all previously disposed of vehicles matching the given vehicle attributes. In an illustrative embodiments, the vehicle data (e.g., vehicle monitoring data, vehicle age, vehicle mileage, vehicle repairs) associated with the vehicles with low depreciation values may result in a low corresponding wear-and-tear score, while the vehicle data associated with the vehicles with high depreciation values result in high wear-and-tear score, with low wear-and-tear score being a desirable score.

Figure 6:
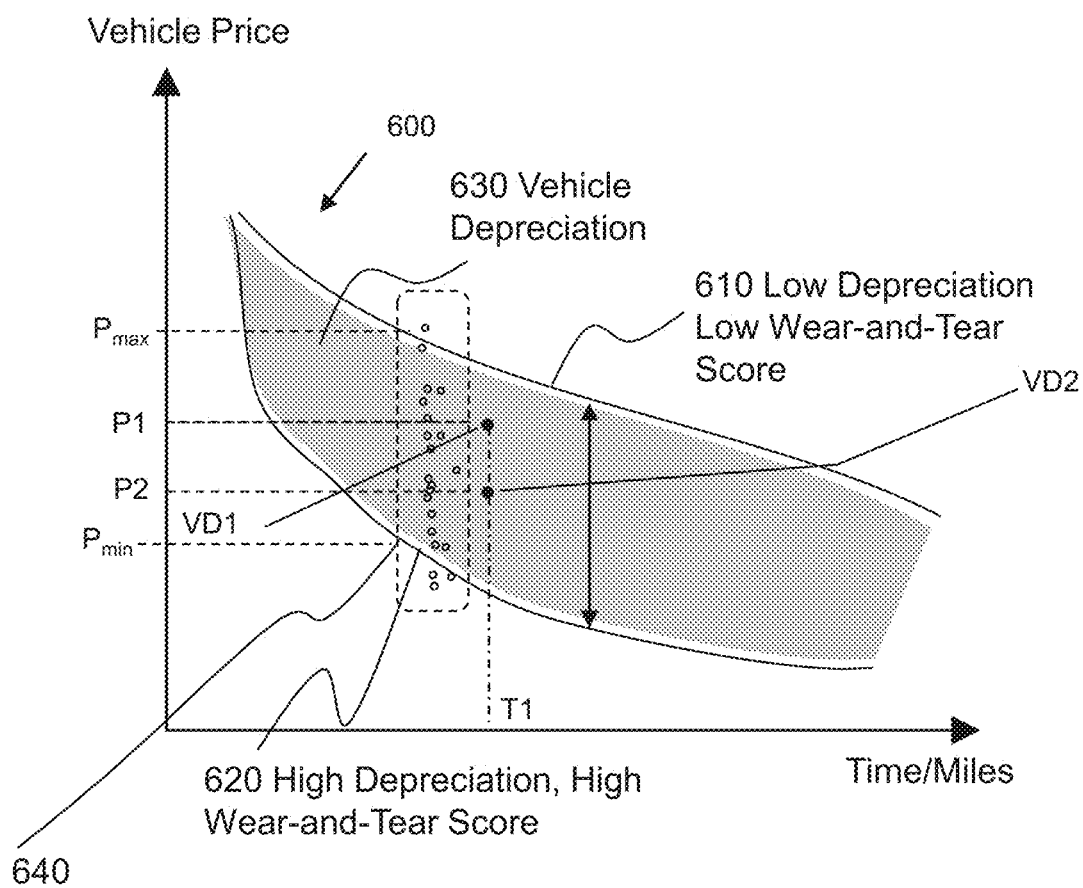
FIG. 6 is a chart illustrating vehicle price as a function of a vehicle age (time) or miles driven by a vehicle, consistent with disclosed embodiments.
Figure 7:
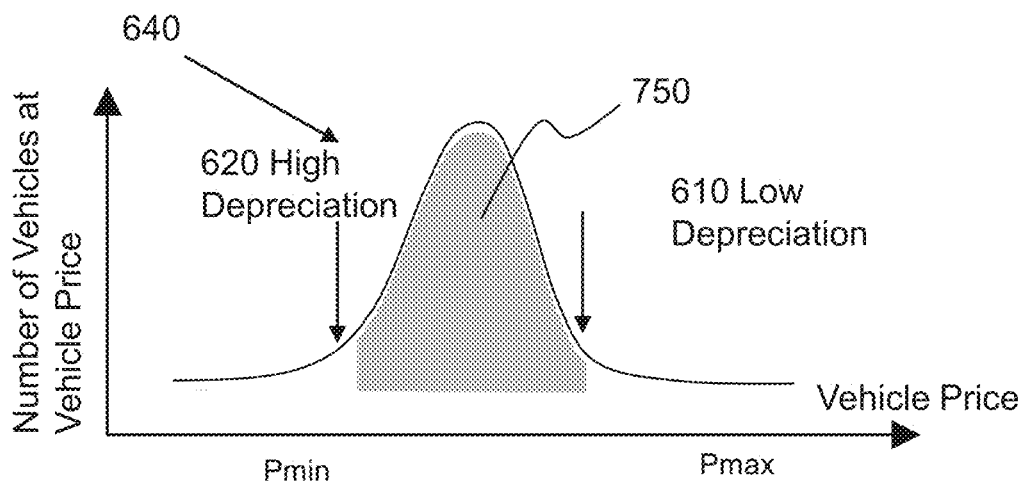
FIG. 7 is a chart illustrating a number of vehicles as a function of a vehicle price for a given vehicle age or miles driven by a vehicle consistent with disclosed embodiments.

FIG. 6 shows an example chart of depreciation of various vehicles as a function of time (i.e., vehicle age) or miles traveled by the vehicle for a vehicle with given vehicle attributes. The chart may be, for example, presented by interface system 194 to owner 180. In an illustrated embodiment, graph 600 may be a graph of points (points in a region 640 are illustrated). For example, the point associated with vehicle data VD1 corresponds to a vehicle sold at price P1 at time/millage T1, while point associated with vehicle data VD2 corresponds to a vehicle sold at price P2 at time/millage T1. Since price P1 is higher than price P2, the vehicle associated with vehicle data VD1 has a lower wear-and-tear score when compared to a wear-and-tear score for the vehicle associated with vehicle data VD2. In various embodiments, the wear-and-tear score may be normalized resulting in the wear-and-tear score for vehicles with price Pmax being zero (the best wear-and-tear score), and the wear-and-tear score for vehicles with price Pmin being 100 (the worst wear-and-tear score). It should be noted that prices Pmax and Pmin are obtained using a statistical approach. For example, FIG. 7 shows the distribution of cars for various vehicle prices as illustrated by vehicle data points in region 640. In illustrative embodiments, the region 750 between point 620 corresponding to vehicles with high depreciation and point 610 corresponding to vehicles with low depreciation may include 95% of all the cars disposed of by owner 180 having time/millage T1. It should be noted, that 95% value is chosen as an illustrative value only, and any suitable value may be used as well.

In various embodiments, vehicle data such as (e.g., vehicle monitoring data, vehicle age, vehicle mileage, vehicle repairs) for vehicles disposed of at a given price may vary. Thus, different vehicle data may correspond to the same wear-and-tear score based only on depreciation rates for the vehicle.

In various embodiments, the wear-and-tear score may be calculated in various other ways. In an example embodiment, individual wear-and-tear scores may be calculated for various components of the vehicle, and a combined wear-and-tear score may include a set of individual wear-and-tear scores. For example, main vehicle components such as brakes, electrical system, engine, transmission or the like may have associated wear-and-tear scores. In an illustrative embodiment, a wear-and-tear score for a component for a vehicle with particular vehicle attributes may be calculated based on the age of the component, the vehicle mileage, and the monitoring data. In an example embodiment, a wear-and-tear score of a new component may be low (e.g., zero) and may increase during the usage of the vehicle. In an example embodiment, braking data for the vehicle may be used to establish a wear-and-tear score for brakes. For example, a set of braking events (e.g., 1000 braking events resulting in vehicle deceleration above a certain threshold) may increase the wear-and-tear score associated with braking by one unit. The above example of calculating a wear-and-tear score for braking is only illustrative, and other approaches may be used.

Similar to a wear-and-tear score for brakes, a wear-and-tear score may be established for other components. For example, a wear-and-tear score for an engine may, in part, be based on a regularity of an oil change. Similarly, a wear-and-tear score of various components may depend on the regularity of maintenance of these components. In some embodiments, the wear-and-tear score for a component may exhibit dramatic changes if monitoring system 185 detects an unusual performance of the component. For example, if monitoring system 185 reports the failure of a given component, the wear-and-tear score of such component may be maximum (e.g., 100).

It should be noted, that a wear-and-tear score may be calculated in many other possible ways. In some cases, the wear-and-tear score may be evaluated by a certified technician. In some cases, the wear-and-tear score may be obtained by averaging the wear-and-tear score calculated by several different approaches. In some cases, the wear-and-tear score for the entire vehicle can be obtained as a weighted average of individual wear-and-tear scores. In an example embodiment, the weight for an individual wear-and-tear score may be selected based on the importance of components associated with such individual wear-and-tear score.

In various embodiments, external condition of the vehicle and performance of various options within a vehicle may significantly affect the overall wear-and-tear score for the vehicle as the vehicle may not be appealing to buyers; thus affecting the vehicle depreciation. For example, if a vehicle contains dents and stains in the vehicle interior, if a vehicle does not contain a navigation panel or a rearview camera, or if a vehicle is lacking standard features associated with the make, model, trim and standard options for the vehicle, the wear-and-tear score for the vehicle may be increased. Thus, the external condition of the vehicle may be considered as one of the components of a vehicle for calculating a wear-and-tear score. In various embodiments, the individual wear-and-tear score based only on external condition of the vehicle may be evaluated by considering depreciation of other vehicles having the same vehicle attributes and similar individual wear-and-tear scores for various vehicle components other than the external condition of a vehicle.

Returning to the flowchart of FIG. 5, at step 530, data processing module 193 may evaluate a vehicle depreciation based on the wear-and-tear score for vehicle 183 and at step 540, data processing module 193 may store data including wear-and-tear score and the predicted depreciation for vehicle 183 in database 191. The vehicle depreciation may be estimated at step 530 based on the correlation between the depreciation of previously disposed of vehicles and their reported wear-and-tear scores.

Figure 8:
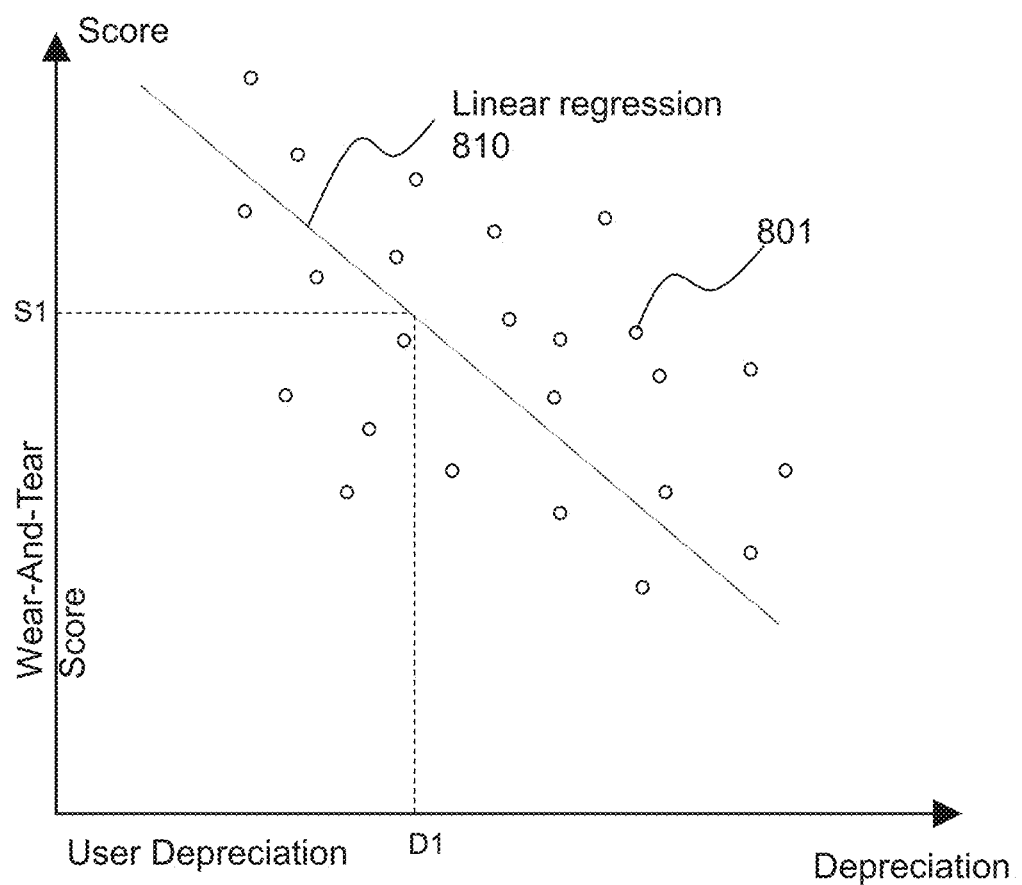
FIG. 8 is a graph of an illustrative relationship between a vehicle depreciation and a wear-and-tear score for the vehicle, consistent with disclosed embodiments.

In an illustrative example shown in FIG. 8, a wear-and-tear score and related depreciation of previously disposed of vehicles are plotted as a set of points 801. A linear regression line 810 may be plotted through the set of points, as shown in FIG. 8. Using a calculated wear-and-tear score for vehicle 183 (e.g., S1) vehicle owner 180 may obtain the expected depreciation of the vehicle D1 as shown in the FIG. 8 In various embodiments, as explained before, a wear-and-tear score for a vehicle may be calculated based on vehicle data such as vehicle monitoring data, a vehicle age, a vehicle mileage, as well as repairs associated with vehicle 183.

Figure 9:
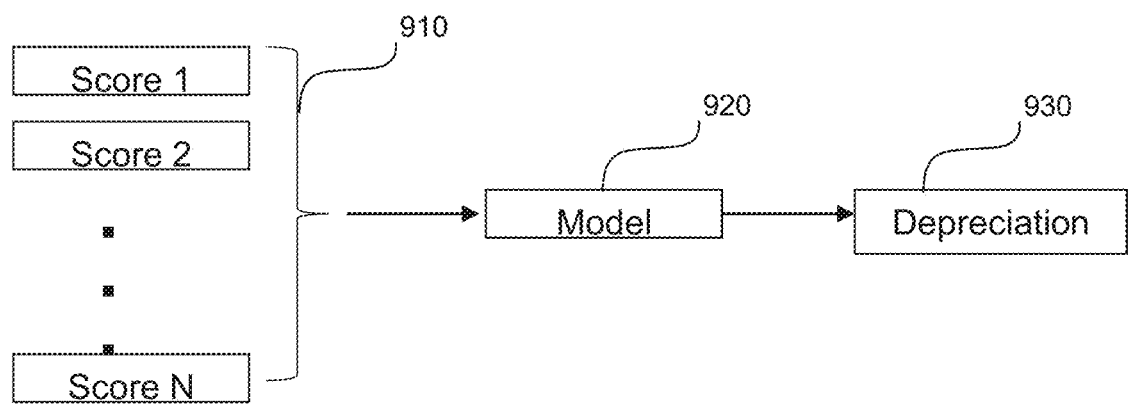
FIG. 9 is a diagram of an illustrative computer-based model for obtaining a vehicle depreciation using a wear-and-tear score, consistent with disclosed embodiments.
Figure 10:
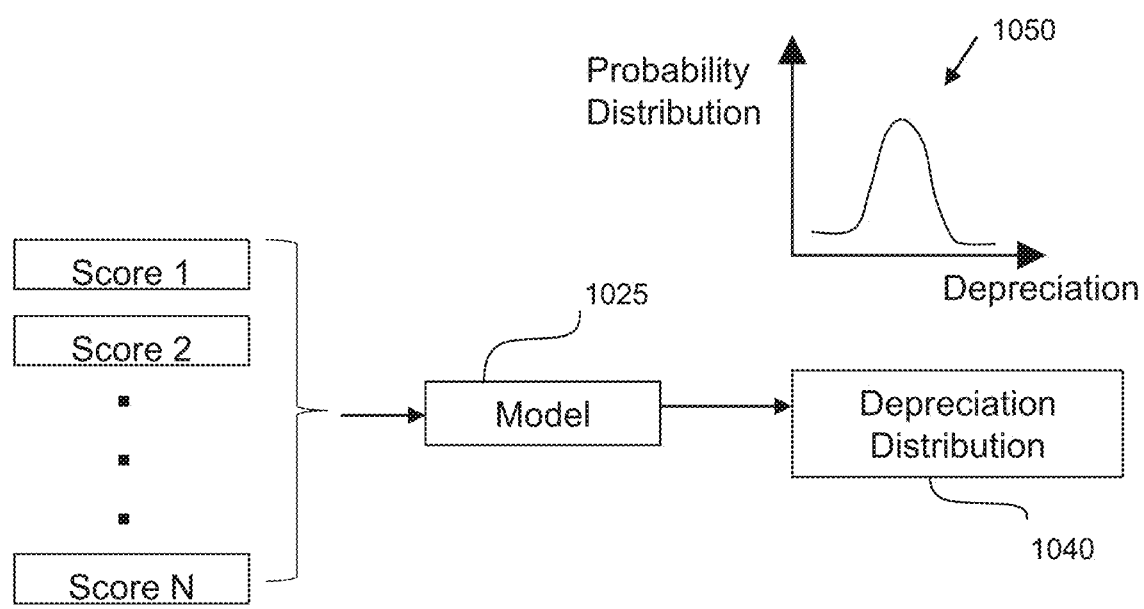
FIG. 10 is a diagram of an illustrative computer-based model for obtaining a probability distribution of vehicle depreciation using wear-and-tear score consistent with disclosed embodiments.

FIG. 9 shows an illustrative embodiment of obtaining a depreciation rate 930 for a vehicle using a model 920 for a wear-and-tear score 910 represented by a number of individual wear-and-tear scores, Score 1 through Score N. In various embodiments, depreciation rate 930 may be calculated using model 920 that may include machine-learning models, such as neural networks, decision trees, and models based on ensemble methods, such as random forests. The machine-learning models may have parameters that may be selected for optimizing the performance of model 920. For example, parameters specific to a particular type of model (e.g., the number of features and number of layers in a neural network) may be optimized to improve the model's performance. In some embodiments, as shown, for example, in FIG. 9 model 920 may return a single number related to vehicle depreciation (e.g., a current price of the vehicle), and in some embodiments, as shown in FIG. 10, a model 1025 (that may also include machine-learning models) may return a probability distribution 1040 schematically shown by a graph 1050.

Figure 11:
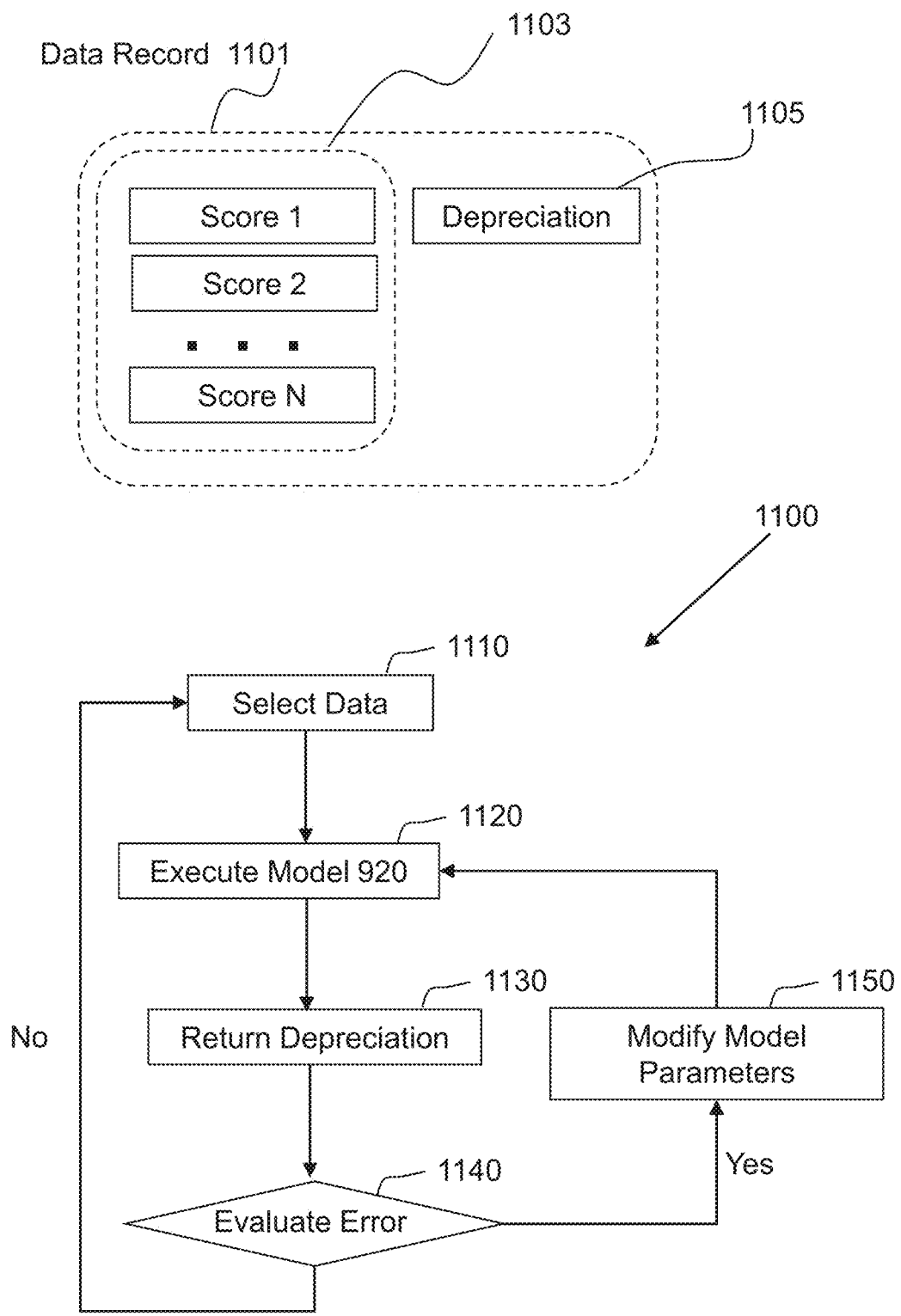
FIG. 11 is a flowchart of an illustrative process of training computer-based models, consistent with disclosed embodiments.

In various embodiments, model 920 and model 1025 may be trained using a data set containing information related to vehicle data, a wear-and-tear score of a vehicle and a depreciation of previously disposed of vehicles. FIG. 11 illustrates a data record 1101 for training a machine learning model and a process 1100 for training a model. Data record 1101 may include a wear-and-tear score 1103 that may include a set of individual wear-and-tear scores (e.g., Score 1 through Score N) for a previously sold vehicle, together with the vehicle depreciation data 1105. In an example embodiment of process 1100, at a step 1110, training data is selected for training a machine learning model, such as model 920. In various embodiments, the training data may be related to a vehicle with particular vehicle attributes. In various embodiments, the training data may include mileage for an associated vehicle in addition to wear-and-tear score 1103 and depreciation data 1105. In some embodiments, the training data may also include repairs done to a vehicle, and in some embodiments, the training data may also include monitoring data for the vehicle. In various embodiments, training data may include multiple data records 1101, with each record processed consecutively by model 920 or model 1025. At step 1110 of process 1100, model 920 can acquire training data record 1101, at a step 1120 perform computations, and at a step 1130 return a predicted depreciation value of the already disposed of vehicle with known depreciation data 1105. In various embodiments, the predicted depreciation value may be compared with depreciation data 1105 to evaluate an associated error for model 920 at a step 1140. If the error is below the threshold value (step 1140, NO), process 1100 may proceed to step 1110 of acquiring a next training data record 1101. If the error is above the threshold value (step 1140, YES), process 1100 may proceed to a step 1150 of modifying model parameters and subsequently returning to step 1120. In various embodiments, model 920 may be rated based on the average error generated by model 920. In various embodiments, a model may be tailored for each vehicle with given vehicle attributes.

FIG. 12 shows a process 1200 which may be a variation of process 400 shown in FIG. 5. For example, process 1200 may include steps 510, 520 and 530 of process 500. At a step 1250 of process 1200, a list of suggested maintenance actions may be generated. In some embodiments, the list of suggested maintenance actions may include suggested repairs (e.g., transmission repair, brake replacement, body repair, headlamp replacement, etc.), suggested maintenance (e.g., oil change, transmission fluid change, etc.) suggested cleaning (interior cleaning, seat replacement, carpet cleaning, etc.) with each suggested maintenance action indicating expected decrease in depreciation of a vehicle (i.e., increase in selling price of the vehicle). In various embodiments, suggested maintenance actions may be generated using machine-learning models. For example, a machine-learning model may include a neural network, or the like, and can be trained on data that may include a wear-and-tear score for a vehicle, a predicted depreciation for the vehicle, one or more vehicle maintenance actions, and a corresponding increase in the vehicle price due to execution of one or more of the vehicle maintenance actions.

FIG. 13 shows an illustrative graph 1300 of representative maintenance actions labeled 1, 2 and 3 and resulting increase in a vehicle effective price due to these actions. The vehicle effective price may be calculated as a difference between the vehicle sales price after the maintenance action and the cost of the corresponding maintenance action. For example, action 3 results in a vehicle effective price increasing from value PO to value P1, action 1 results in the vehicle effective price increasing from value PO to value P2, and action 2 results in the vehicle effective price increasing from value PO to value P3. If only one maintenance action is taken, graph 1300 shows that action 2 is preferred to obtain the highest vehicle effective price. As shown in FIG. 13, when action 3 is followed by action 1 the vehicle may be sold at an effective price of P4, when action 1 is followed by action 2 the vehicle may be sold at an effective price of P5 that, in an illustrative embodiment, may be larger than P4, and when action 2 is followed by action 3 the vehicle may be sold at an effective price of P6 that may be larger than P5 in an illustrative embodiment.

In various embodiments, the order of actions may not be important and result in the expected vehicle effective price of P7 when all the maintenance action 1, 2, and 3 are taken. Graph 1300 may be presented to vehicle owner 180 via interface 194 and may allow vehicle owner 180 to quickly overview possible maintenance actions and their associated impact on the vehicle sales price. Graph 1300 shown in FIG. 13 is only illustrative, and maintenance actions may lead to various changes to the vehicle effective price. For example, in some embodiments, the order of actions may be important. For example, the order of actions may be important if the last maintenance action involves cleaning the vehicle. In some embodiments, the effect of maintenance actions may depend on other factors associated with a sale of the vehicle such as the location of the vehicle, vehicle attributes, time of sale of the vehicle, or other external factors such as fashion, weather patterns, gas prices or the like.

Figure 14:
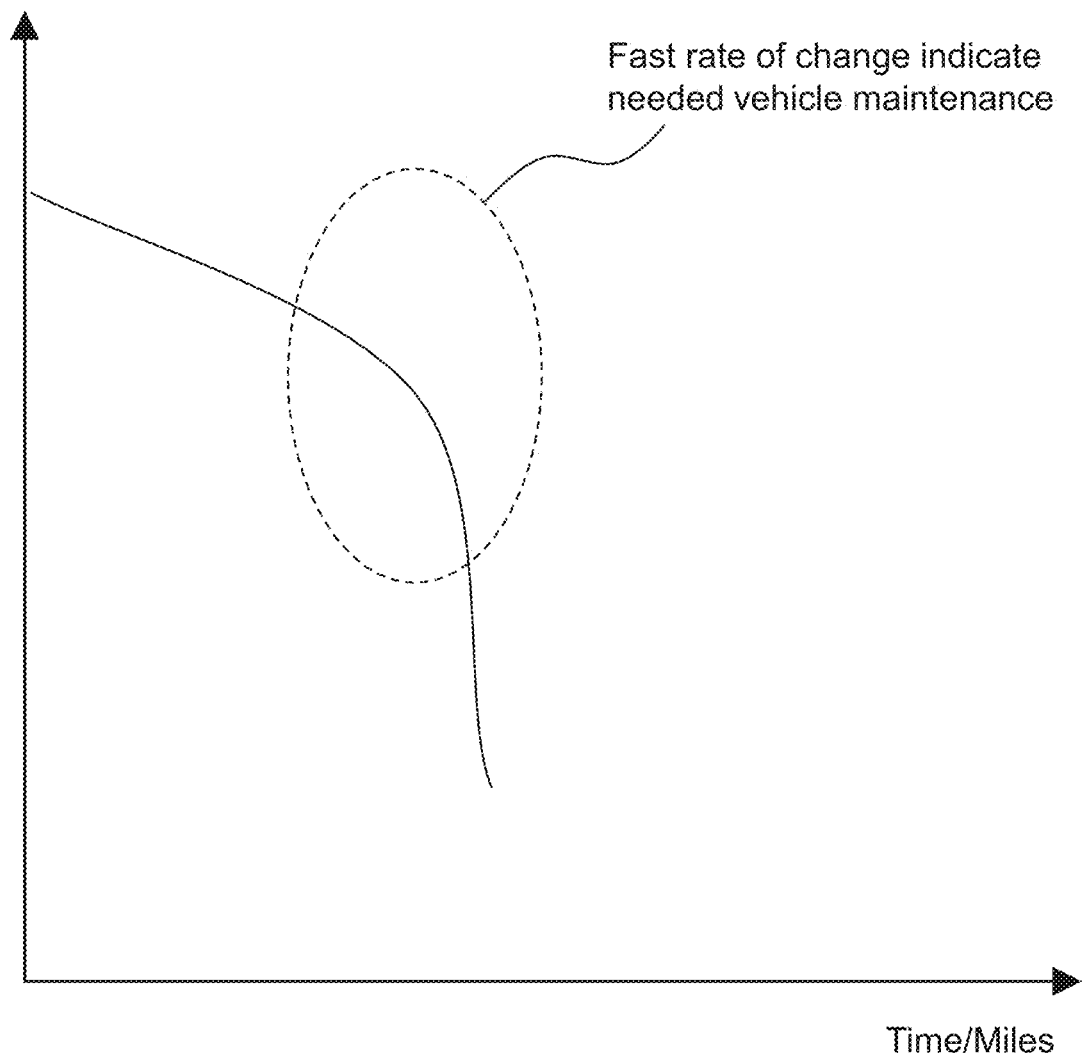
FIG. 14 is a graph of an illustrative change in wear-and-tear score of a vehicle as a function of vehicle age or miles traveled by a vehicle, consistent with disclosed embodiments.

In various embodiments, vehicle owner 180 may monitor a wear-and-tear score for the vehicle via interface 194. In some embodiment, vehicle owner 180 may monitor a comprehensive (single) wear-and-tear score, and in some embodiments, vehicle owner 180 may monitor a wear-and-tear score associated with individual components of the vehicle. In some embodiments, system 190 may be configured to inform vehicle owner 180 about rapid changes in the wear-and-tear score that may indicate that the vehicle needs to be repaired. For example, the wear-and-tear score may be plotted as a function of time as shown in FIG. 14, indicating a vehicle failure. In some embodiments, the rate of change of comprehensive or individual wear-and-tear score above a threshold value may result in vehicle system 190 issuing a notification to vehicle owner 180. In various embodiments, threshold values may be determined based on a historical correlation between various wear-and-tear scores and various vehicle failures associated with those scores.

Figure 15:
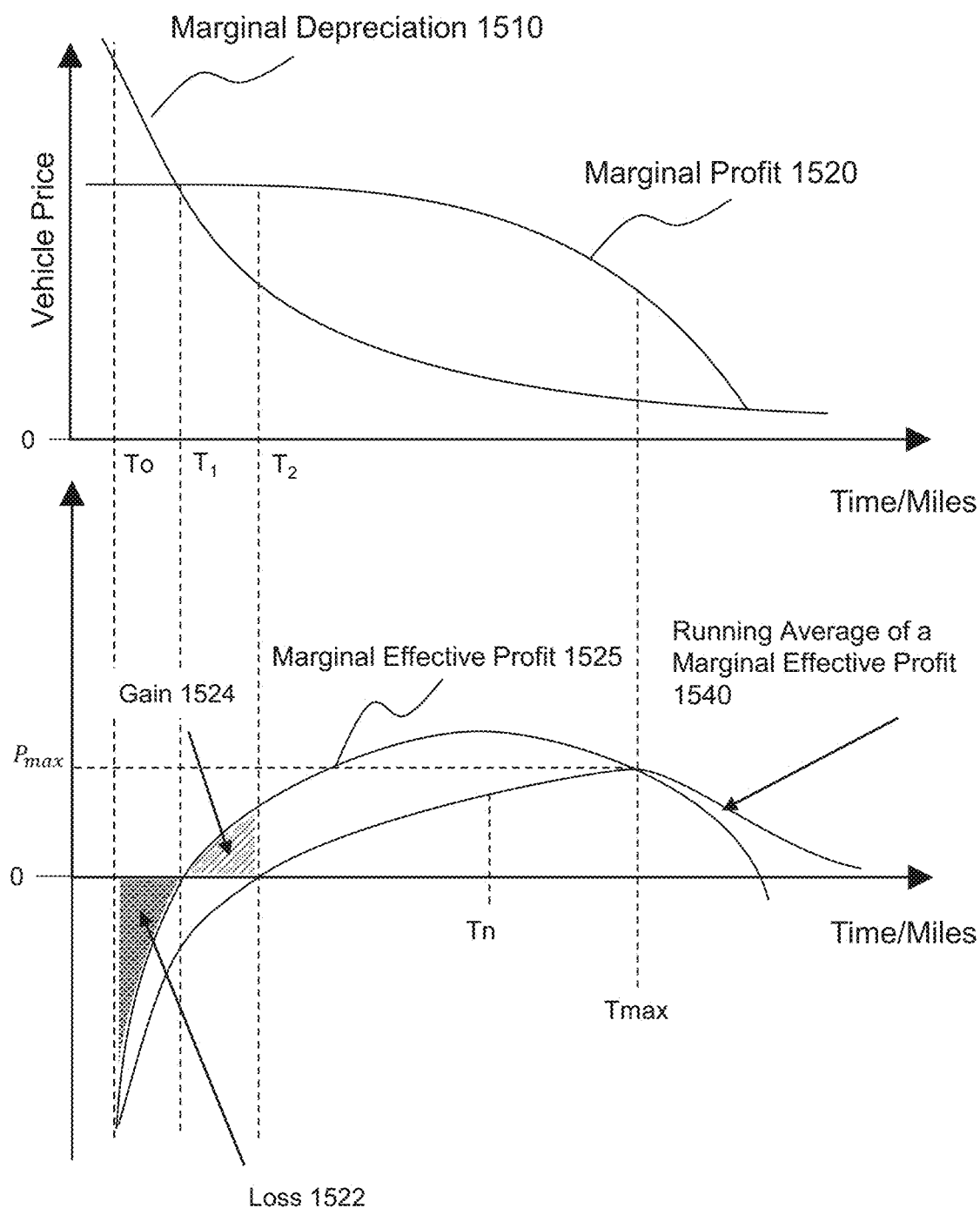
FIG. 15 is a chart of illustrative financial data that can be used to decide when to dispose of a vehicle, consistent with disclosed embodiments.

In various embodiments, vehicle owner system 190 may inform vehicle owner 180 when to dispose of an income-generating vehicle 183. FIG. 15 shows representative graphs of various financial data including a marginal depreciation 1510, a marginal profit 1520, a marginal effective profit 1525 and a running average of a marginal effective profit 1540. For brevity, graphs of financial data may be referred to as curves 1510, 1520, 1525 and 1540 in subsequent discussion.

As used herein, unless otherwise noted, the term "marginal depreciation" (MD) is referred to as depreciation of a vehicle per unit of time. For example, a daily marginal depreciation is the depreciation of a vehicle per day from the price of the vehicle at a previous day. For example, if a vehicle price is decreased by $10.45 dollars in a day from the value of $26,000 of the previous day than daily marginal depreciation is $10.45.

As used herein, unless otherwise noted, the term "marginal income" is referred to as an income generated by an inventory per unit of time. Also, as used herein, unless otherwise noted, the term "marginal profit" (MP) is referred to as a profit generated by an inventory per unit of time, where profit may be calculated as a difference between an income generated by an inventory and costs associated with the inventory maintenance. As used herein, unless otherwise noted, the term "marginal effective profit" (MEP) is referred to as the difference between marginal profit and marginal depreciation, MEP(t)=MP(t)−MD(t). For example, if a marginal income from vehicle 183 is $40, costs associated with the vehicle maintenance per day are $10, and a marginal depreciation for vehicle 183 is $7, then marginal effective profit for the vehicle is $40−$10−$7=$23. The marginal effective profit may be used to obtain an effective profit for a given interval of time. For example, effective profit for an interval of time that spans a working week (i.e., Monday-Friday) may be calculated as a sum of marginal effective profits for the days in the interval of time (e.g., Monday-Friday), such as, MEP(Monday)+MEP(Tuesday)+ . . . MEP (Friday).

FIG. 15 shows that marginal depreciation 1510 may be high for a new vehicle at time $T_0$, but may decrease for larger times (e.g., at time $T_2$) in accordance with typical vehicle depreciation trends. For example, some vehicles may depreciate as much as 10% as soon as they are used for the first time. In an illustrative embodiment shown in FIG. 15, marginal profit 1520 generated from a vehicle may be steady and high when a vehicle is new (e.g., at time $T_0$ as shown in FIG. 15) but may decrease considerably for an older vehicle (e.g., at time $T_{max}$, as shown in FIG. 15). The decrease in marginal profit 1520 is related to rental/lease time loss associated with increased maintenance for the older vehicle, increase in maintenance costs, and decrease in a demand for the older vehicle. In various embodiments, marginal profit 1520 obtained from vehicle 183 may include losses due to maintenance of a vehicle and any other losses associated with owning and renting vehicle 183 (e.g., costs associated with parking and managing vehicles, customer assistance related costs, taxes and interest paid by owner, toll fees, gas fees, vehicle transportation costs, etc.)

For brevity of discussion, we will use time as a parameter for plotting marginal data, such as curves 1510, 1520, 1525, and 1540 shown in FIG. 15, with the understanding that miles driven by vehicle 183 may be used in a similar way. For the purposes of this discussion, all the elements, concepts and notation related to time may be equally applied to miles driven by vehicle 183.

FIG. 15 shows marginal effective profit 1525 as a difference between marginal profit 1520 and marginal depreciation 1510. In various embodiments, marginal effective profit 1525 for a new vehicle may be negative due to a rapid depreciation of the new vehicle. Consider for example a vehicle depreciating by $2000 in a first day, with marginal profit 1520 in a first day being $40, the marginal effective profit during a first day is then $40-$2000 resulting in negative $1960. In various embodiments, when marginal depreciation 1510 for the vehicle is higher than marginal profit 1520 generated by a vehicle, marginal effective profit is negative. The loss associated with rapid depreciation of vehicle 183 is illustrated by an integrated effective profit corresponding to a shaded area 1522 and is referred to as loss 1522. At a time $T_1$, marginal depreciation 1510 matches marginal profit 1520 and marginal effective profit 1525 is, therefore, zero. Starting from time $T_1$, vehicle owner 180 may experience overall gain in profit from vehicle 183 since marginal depreciation 1510 is smaller than marginal profit 1520. At an illustrative time $T_2$, integrated effective profit corresponding to shaded area 1524 may correspond to a net gain and is referred to as gain 1524. For illustration purposes, $T_2$ may be selected, such that gain 1524 is the same as loss 1522.

In various embodiments, a running average of a marginal effective profit 1540 (RAMEP(t)) as a function of time at time point T may be calculated by averaging MEP(t) between the initial time $T_0$ (e.g., $T_0$=0) and time point T. RAMEP(T) indicates the average profit that vehicle owner 180 makes per day when using vehicle 183 for time T (e.g., when using vehicle 183 for a month from the first purchase of the vehicle). For example, at T=$T_2$, RAMEP($T_2$) is zero as can be seen from running average of a marginal effective profit 1540 depicted in FIG. 15, as well as the fact that at time $T_2$ gain 1524 is the same as loss 1522 resulting in no net gain or loss. Thus, when using vehicle 182 for $T_2$ number of days, vehicle owner 180 on average will generate no profit. At time T=$T_{max}$, RAMEP($T_{max}$) exhibits a maximum (e.g., vehicle owner 180 may get, on average, $P_{max}$ dollars of profit per day) which is the largest average marginal effective profit that vehicle owner 180 may obtain from vehicle 183. Thus, time T=$T_{max}$, is the best time to dispose of a vehicle.

In various embodiments, data processing module 193 of vehicle owner system 190 may calculate RAMEP(T) as RAMEP(T)=(1/T)$\int_0^T$ MEP ($\tau$) d$\tau$. In various embodiments, under the assumption that MEP(t) is a differentiable function (i.e., a function that does not exhibit discontinuities), the maximum of RAMEP(T) is obtained when RAMEP(T) crosses marginal effective profit 1525 at point $T_{max}$. This condition may, for example, be established by evaluating setting a derivative of RAMEP(T) to zero, d [RAMEP(T)]/dT=0 at T=$T_{max}$ as required for the presence of maximum at T=$T_{max}$. The intersection of curve 1525 and curve 1540 as shown in FIG. 15, and the proximity of these curves around time $T_{max}$ may be used as an alternative, or additional condition for a vehicle disposal. In an illustrative embodiment, the maximum of RAMEP(T) may not be easily detectable until it already happens, while a decrease in a value between curve 1525 and curve 1540 can be easily tracked before curves 1525 and 1540 intersect.

In an illustrative embodiment, vehicle owner system 190 may establish a target range, and if values of curve 1525 and curve 1540 are within the established target range, the vehicle owner system 190 may notify the vehicle owner 180 that it may be a good time to dispose of vehicle 183. One of the benefits of defining the target range may be due to the fact that it may take time for vehicle owner 183 to dispose of vehicle 183, and vehicle-related financial data such as marginal depreciation of vehicle 183 and marginal effective profit generated from vehicle 183 may change during that time.

Figure 16:
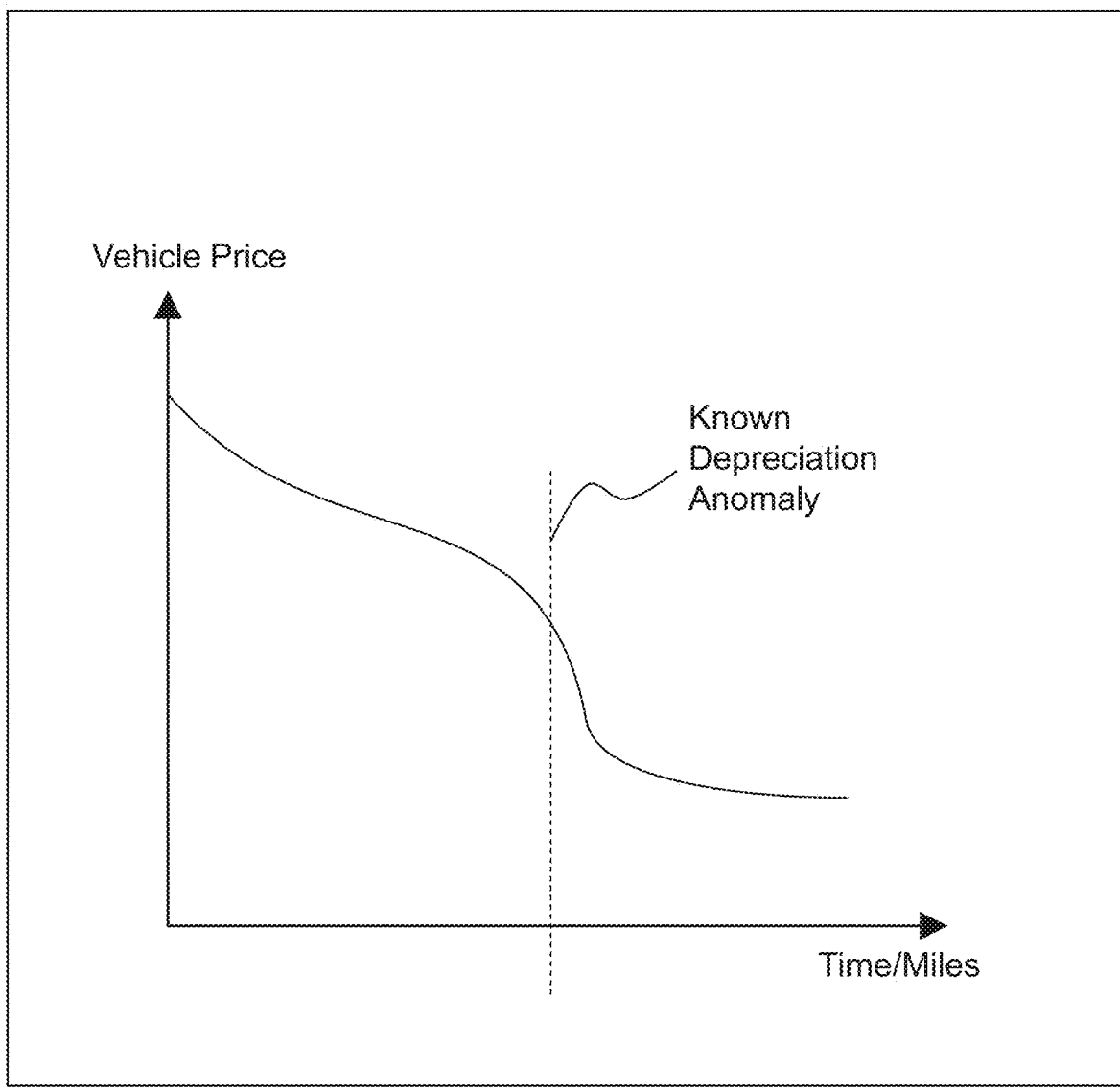
FIG. 16 is a graph of an illustrative change in vehicle price as a function of vehicle age or miles traveled by a vehicle, consistent with disclosed embodiments.

While FIG. 15 demonstrates one approach for estimating the time (or miles traveled by a vehicle) for selling the vehicle, various other approaches may be used as well. For example, in an illustrative embodiment shown in FIG. 16 the disposal time may be influenced by a significant change in depreciation for the vehicle that may be based on historical data. In an illustrative embodiment, the vehicle may be disposed of or repaired if a change in vehicle depreciation is predicted. For example, a significant change in depreciation may be predicted based on previously known depreciation trends for vehicle 183. In an example embodiment, vehicle 183 may be known to have mechanical problems that manifest themselves for vehicles that are older than a threshold age or have a millage above a threshold value.

In various embodiments, various financial data may be used by vehicle owner system 190 for obtaining a recommendation for vehicle disposal for vehicle owner 180. In an illustrative embodiment, vehicle depreciation may be used, and additionally or alternatively, vehicle marginal depreciation may be used as described above. In various embodiments, vehicle depreciation or vehicle marginal depreciation may be a part of depreciation data obtained by vehicle owner system, and various elements of this depreciation data may be used for predicting the best time for vehicle disposal.

In various embodiments, a profit generated by a vehicle may be used, and additionally or alternatively, vehicle marginal profit may be used as described above. In various embodiments, vehicle profit or vehicle marginal profit may be a part of profit data obtained by vehicle owner system, and various elements of this profit data may be used for predicting the best time for vehicle disposal. In various embodiments, an effective profit may include a difference between a profit generated by a vehicle and vehicle depreciation. In various embodiments, effective profit or marginal effective profit (as defined above) may be a part of profit data obtained by vehicle owner system 190, and various elements of this profit data may be used for predicting the best time for vehicle disposal.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A computer implemented method for generating maintenance actions of a vehicle based on trained machine learning of monitored vehicle data, the computer implemented method comprising:
    collecting, by an onboard diagnostic data scanner of an internal monitoring system of the vehicle, onboard diagnostic data comprising: speed, acceleration and deceleration of the vehicle, as well as location of the vehicle and a failure of brakes of the vehicle;
    detecting, by a plurality of cameras of an external monitoring system of the vehicle, a vehicle collision indicating that the vehicle has been hit by other vehicles or objects from: a back of the vehicle, a front of the vehicle, or a side of the vehicle;
    detecting, by the plurality of cameras of the external monitoring system, visual data indicating a presence of a bump on a road;
    correlating, by a plurality of sensors of the external monitoring system, the acceleration of the vehicle with the location of the vehicle, and with sound data and the visual data observed from the plurality of cameras;
    correlating, by the plurality of sensors of the external monitoring system, the visual data of the bump with a vertical vibration of the vehicle as it passes over the bump;
    correlating, by the plurality of sensors of the external monitoring system, the vertical vibration of the vehicle with the speed of the vehicle while the vehicle is passing over the bump;
    storing, by the internal and external monitoring systems, monitoring data from: the speed, the collision, the failure of the brakes and the deceleration of the vehicle, indicating that a significant vehicle-related event has occurred;
    transmitting, via a mobile network, the monitoring data of the significant vehicle-related event when a signal strength of the mobile network is greater than a predetermined signal strength of a long-term evolution connection;
    establishing, an overall wear-and-tear score of the vehicle based on a weighted average of respective wear-and-tear scores of the brakes and other individual components of the vehicle, based on the monitoring data and based on the vehicle reaching a predetermined number of braking events resulting in the deceleration of the vehicle above a certain limit;
    training, by one or more processors, a neural network, by: consecutively selecting and processing a number of features and layers specific to a model of the neural network according to: the monitoring data, the overall wear-and-tear score of the vehicle and repairs done to the vehicle, to improve performance of the neural network model;
    rating the neural network model based on an average error generated by the neural network model according to the number of consecutively selected and processed features and layers specific to the neural network model;
    detecting, by the neural network model using the rating, that the average error is above a threshold error value;
    modifying, by the neural network model, the number of the features and the number of the layers specific to the neural network model in response to detecting that the average error is above the threshold error value until the average error drops below the threshold error value;
    suggesting, by the trained neural network model, maintenance actions for the vehicle based on the overall wear-and-tear score for the vehicle and the repairs done to the vehicle.

2. The computer implemented method of claim 1, further comprising:
    generating predicted maintenance costs for the vehicle.

3. The computer implemented method of claim 2, wherein the predicted maintenance costs further comprise:
    predicted cost of cleaning the vehicle;
    predicted cost of operating the vehicle; and
    predicted cost of repairing the vehicle.

4. The computer implemented method of claim 1, further comprising:
    generating a profile for a user, the profile for the user comprising a history of respective monitoring data associated with vehicles driven by the user.

5. The computer implemented method of claim 4, further comprising:
    generating a first contract between the user and an owner for the vehicle, the first contract including a first price for using the vehicle.

6. The computer implemented method of claim 5, further comprising:
    generating a second contract between the user and the owner based on the first contract and the history of the respective monitoring data.

7. The computer implemented method of claim 6, wherein the second contract comprises a second price for using the vehicle.

8. The computer implemented method of claim 1, wherein the monitoring data comprises the acceleration for the vehicle.

9. The computer implemented method of claim 1, wherein the monitoring data comprises the onboard diagnostics data.

10. The computer implemented method of claim 1, further comprising:
    generating predicted depreciation data of the vehicle, based on sales data and the monitoring data.

11. The computer implemented method of claim 1, further comprising:
    providing a recommended disposal time for the vehicle, based on the overall wear-and-tear score.

12. The computer implemented method of claim 11, wherein providing a recommended disposal time comprises:
    evaluating a marginal effective profit value;
    evaluating a running average of the marginal effective profit value;
    establishing a target range; and recommending disposal of the vehicle when the marginal effective profit value for the vehicle and the running average of the marginal effective profit are within the target range.

13. The computer implemented method of claim 1, further comprising:
generating a profile for the vehicle, the vehicle being an income generating vehicle and the profile comprising at least age, mileage, and the location of the vehicle.

14. The computer implemented method of claim 1, further comprising:
generating and plotting on an interface, a graph of the overall wear-and-tear score, wherein the graph includes one or more of a bar graph and a chart graph.

15. The computer implemented method of claim 1, further comprising:
generating predicted profit data from the vehicle.

16. A system for generating maintenance actions of a vehicle based on trained machine learning of monitored vehicle data, the system comprising:
internal and external monitoring systems of the vehicle, configured to:
store monitoring data from: speed, collision, failure of brakes and deceleration of the vehicle, indicating that a significant vehicle-related event has occurred;
an onboard diagnostic data scanner of the internal monitoring system of the vehicle, configured to:
collect onboard diagnostic data comprising: acceleration, the speed, and the deceleration of the vehicle, as well as location of the vehicle and the failure of the brakes of the vehicle;
a plurality of cameras of the external monitoring system of the vehicle, configured to:
detect the vehicle collision indicating that the vehicle has been hit by other vehicles or objects from: a back of the vehicle, a front of the vehicle, or a side of the vehicle, and
detect visual data indicating a presence of a bump on a road;
a plurality of sensors of the external monitoring system, configured to:
correlate the acceleration of the vehicle with the location of the vehicle, and with sound data and the visual data observed from the plurality of cameras,
correlate the visual data of the bump with a vertical vibration of the vehicle as it passes over the bump,
correlate the vertical vibration of the vehicle with the speed of the vehicle while the vehicle is passing over the bump,
a mobile network configured to transmit the monitoring data of the significant vehicle-related event when a signal strength of the mobile network is greater than a predetermined signal strength of a long-term evolution connection;
one or more processors configured to:
establish, an overall wear-and-tear score of the vehicle based on a weighted average of respective wear-and-tear scores of the brakes and other individual components of the vehicle, based on the monitoring data and based on the vehicle reaching a predetermined number of braking events resulting in the deceleration of the vehicle above a certain limit; and
a neural network, trained by the one or more processors to:
consecutively select and process a number of features and layers specific to a model of the neural network according to: the monitoring data, the overall wear-and-tear score of the vehicle and repairs done to the vehicle, to improve performance of the neural network model;
rate the neural network model based on an average error generated by the neural network model according to the number of consecutively selected and processed features and layers specific to the neural network model;
detect, using the rating, that the average error is above a threshold error value;
modify, the number of the features and the number of the layers specific to the neural network model in response to detecting that the average error is above the threshold error value until the average error drops below the threshold error value;
suggest maintenance actions for the vehicle based on the overall wear-and-tear score for the vehicle and the repairs done to the vehicle.

17. The system of claim 16, wherein the monitoring data comprises at least one of measured acceleration data, cornering data, and the onboard diagnostic data.

18. The system of claim 16, wherein the one or more processors are further configured to:
generate predicted maintenance costs for the vehicle comprising:
predicted cost of cleaning the vehicle,
predicted cost of operating the vehicle, and
predicted cost of repairing the vehicle.

19. A non-transitory computer-readable medium storing instructions stored thereon, which when executed by one or more processors, cause the one or more processors to perform operations to generate maintenance actions of a vehicle based on trained machine learning of monitored vehicle data, the operations comprising:
collecting, by an onboard diagnostic data scanner of an internal monitoring system of the vehicle, onboard diagnostic data comprising: speed, acceleration and deceleration of the vehicle, as well as location of the vehicle and a failure of brakes of the vehicle;
detecting, by a plurality of cameras of an external monitoring system of the vehicle, a vehicle collision indicating that the vehicle has been hit by other vehicles or objects from: a back of the vehicle, a front of the vehicle, or a side of the vehicle;
detecting, by the plurality of cameras of the external monitoring system, visual data indicating a presence of a bump on a road;
correlating, by a plurality of sensors of the external monitoring system, the acceleration of the vehicle with the location of the vehicle, and with sound data and the visual data observed from the plurality of cameras;
correlating, by the plurality of sensors of the external monitoring system, the visual data of the bump with a vertical vibration of the vehicle as it passes over the bump;
correlating, by the plurality of sensors of the external monitoring system, the vertical vibration of the vehicle with the speed of the vehicle while the vehicle is passing over the bump;
storing, by the internal and external monitoring systems, monitoring data from: the speed, the collision, the failure of the brakes and the deceleration of the vehicle, indicating that a significant vehicle-related event has occurred;
transmitting, via the mobile network, the monitoring data of the significant vehicle-related event when a signal strength of a mobile network is greater than a predetermined signal strength of a long-term evolution connection;

establishing, an overall wear-and-tear score of the vehicle based on a weighted average of respective wear-and-tear scores of the brakes and other individual components of the vehicle, based on the monitoring data and based on the vehicle reaching a predetermined number of braking events resulting in the deceleration of the vehicle above a certain limit;

training a neural network model, by:
consecutively selecting and processing a number of features and layers specific to the neural network model according to: the monitoring data, the overall wear-and-tear score of the vehicle and repairs done to the vehicle, to improve performance of the neural network model;

rating the neural network model based on an average error generated by the neural network model according to the number of consecutively selected and processed features and layers specific to the neural network model;

detecting, by the neural network model using the rating, that the average error is above a threshold error value;

modifying, by the neural network model, the number of the features and the number of the layers specific to the neural network model in response to detecting that the average error is above the threshold error value until the average error drops below the threshold error value;

suggesting, by the trained neural network model, maintenance actions for the vehicle based on the overall wear-and-tear score for the vehicle and the repairs done to the vehicle.

20. The non-transitory computer-readable medium of claim 19, wherein the operations further comprise:
providing a recommended disposal time for the vehicle, based on the overall wear-and-tear score, wherein providing a recommended disposal time comprises:
evaluating a marginal effective profit value;
evaluating a running average of the marginal effective profit value;
establishing a target range; and
recommending disposal of the vehicle when the marginal effective profit value for the vehicle and the running average of the marginal effective profit are within the target range.

* * * * *